(12) United States Patent
Kulpe

(10) Patent No.: US 11,710,308 B1
(45) Date of Patent: Jul. 25, 2023

(54) SEED GERMINATION DETECTION METHOD AND APPARATUS

(71) Applicant: Just Greens, LLC, Newark, NJ (US)

(72) Inventor: Mohit Anant Kulpe, Jersey City, NJ (US)

(73) Assignee: AeroFarms, Inc., Newark, NJ (US)

( * ) Notice: Subject to any disclaimer, the term of this patent is extended or adjusted under 35 U.S.C. 154(b) by 419 days.

(21) Appl. No.: 17/067,131

(22) Filed: Oct. 9, 2020

Related U.S. Application Data

(60) Provisional application No. 62/913,562, filed on Oct. 10, 2019.

(51) Int. Cl.
| | |
|---|---|
| *G06V 20/10* | (2022.01) |
| *G06N 3/08* | (2023.01) |
| *G06V 10/75* | (2022.01) |
| *G06F 18/213* | (2023.01) |
| *G06F 18/214* | (2023.01) |
| *A01G 31/02* | (2006.01) |

(52) U.S. Cl.
CPC .......... *G06V 20/188* (2022.01); *G06F 18/213* (2023.01); *G06F 18/214* (2023.01); *G06N 3/08* (2013.01); *G06V 10/751* (2022.01); *A01G 31/02* (2013.01)

(58) Field of Classification Search
CPC combination set(s) only.
See application file for complete search history.

(56) References Cited

U.S. PATENT DOCUMENTS

| | | | |
|---|---|---|---|
| 4,332,105 | A | 6/1982 | Nir |
| 5,864,984 | A | 2/1999 | McNertney |
| 5,887,382 | A | 3/1999 | Marshall et al. |
| 6,555,219 | B2 | 4/2003 | Kosinski |
| 6,681,521 | B1 * | 1/2004 | Holloway .............. A01C 1/042 47/56 |
| 6,882,740 | B1 | 4/2005 | McDonald, Jr. et al. |
| 7,059,083 | B2 | 6/2006 | Abitz et al. |
| 8,605,149 | B2 * | 12/2013 | Conrad .................... A01G 7/00 348/135 |
| 8,984,808 | B2 | 3/2015 | Daniels et al. |
| 9,282,699 | B2 | 3/2016 | Anderson et al. |
| 9,320,201 | B2 | 4/2016 | Duncan et al. |
| 9,474,217 | B2 | 10/2016 | Anderson et al. |
| 9,510,524 | B2 | 12/2016 | Anderson et al. |
| 9,814,186 | B2 | 11/2017 | Anderson et al. |
| 10,575,476 | B2 | 3/2020 | Duncan et al. |

(Continued)

FOREIGN PATENT DOCUMENTS

| | | |
|---|---|---|
| CN | 204697662 U | 10/2015 |
| CN | 206314352 U | 7/2017 |

(Continued)

OTHER PUBLICATIONS

U.S. Appl. No. 17/255,347, filed Dec. 22, 2020, Alexander Flippov.

(Continued)

*Primary Examiner* — Solomon G Bezuayehu
(74) *Attorney, Agent, or Firm* — John E. Pillion; McCarter & English, LLP

(57) ABSTRACT

Versions of the disclosure relate to methods of imaging and detecting germinated seeds on a soilless growth medium.

29 Claims, 13 Drawing Sheets

(56) References Cited

U.S. PATENT DOCUMENTS

| | | | |
|---|---|---|---|
| 2004/0141641 A1* | 7/2004 | McDonald, Jr. | G06V 20/69 382/141 |
| 2008/0304710 A1* | 12/2008 | Xu | G06V 10/267 382/110 |
| 2010/0095584 A1 | 4/2010 | Huet et al. | |
| 2010/0095586 A1 | 4/2010 | Sichello | |
| 2012/0227320 A1 | 9/2012 | Dos Santos | |
| 2012/0296468 A1* | 11/2012 | Koehler | B07C 5/342 700/223 |
| 2016/0235025 A1 | 8/2016 | Bray | |
| 2016/0283791 A1 | 9/2016 | Ogura et al. | |
| 2018/0082375 A1 | 3/2018 | Greenberg et al. | |
| 2018/0255720 A1 | 9/2018 | Anderson et al. | |
| 2020/0338599 A1* | 10/2020 | Shniberg | G06F 18/2193 |
| 2021/0183045 A1* | 6/2021 | Iwasawa | G06F 18/22 |
| 2021/0287392 A1* | 9/2021 | Warman | G06T 7/0004 |
| 2022/0142038 A1* | 5/2022 | Amagai | G06T 7/0004 |
| 2022/0346332 A1* | 11/2022 | Clark | A01G 31/02 |
| 2023/0016758 A1* | 1/2023 | Shniberg | A01C 1/00 |

FOREIGN PATENT DOCUMENTS

| | | |
|---|---|---|
| EP | 0579835 A1 | 1/1994 |
| GB | 2330998 A | 5/1999 |
| GB | 2376402 A | 12/2002 |
| GB | 2556469 A | 5/2018 |
| KR | 20150086867 A | 7/2015 |
| WO | 1996028010 A1 | 9/1996 |
| WO | 1998056232 A1 | 12/1998 |
| WO | 2010044270 A1 | 4/2010 |
| WO | 2012156710 A1 | 11/2012 |
| WO | 2018007585 A1 | 1/2018 |

OTHER PUBLICATIONS

Tagliavini, M., et al., Measuring Root Surface Area and Mean Diameter of Peach Seedlings by Digital Image Analysis, HortScience, 28(11):1129-1130, 1993.

Sako, Y. et al., A System for Automated Seed Vigor Assessment, Seed Science and Technology 29(3):625-636, Jan. 2001.

Chatterjee, Dr. Romick, aia: Advanced Color Machine Vision and Application, Graftek Imaging Inc., Mar. 26, 2014.

International Search Report and Written Opinion from related International Patent Application No. PCT/US2019/014561 dated May 8, 2019.

* cited by examiner

SEED GERMINATION DETECTION METHOD AND APPARATUS

CROSS-REFERENCE TO RELATED APPLICATIONS

This application claims priority under 35 U.S.C. § 119(e) to U.S. Provisional Patent Application Ser. No. 62/913,562, entitled "Seed Germination Detection Method and Apparatus" and filed on Oct. 10, 2020, which is hereby incorporated by reference in its entirety.

TECHNICAL FIELD

Versions of the disclosure related to systems and methods of monitoring and detecting the germination of seeds on soilless growth media.

BACKGROUND

Visual observation of seeds and germinating seeds on growing flats has been used to identify flats with sufficient numbers of germinated seeds for placement of the flat in growth chambers and grow towers. Visual observation of germinating seeds and counting them is time-consuming, expensive, often inaccurate, and subject to human error. In many cases, the number of germinated seeds is only a fraction or sampling of the total number of seeds on a flat because the large number of seeds makes it impractical to evaluate all the seeds for germination. Additionally, even when workers observe individual germinated seeds, patterns or regions on the flat where problems exist may not be identified immediately. This can lead to lower yields on flats resulting in lost profits.

A need exists for a more accurate and less complicated determination of germinating seeds on soilless growth media. There is a continuing need to identify germination percentages on growth flats containing seeds at an early stage of germination to avoid low flat yields and to maximize grow tower time and utilization.

SUMMARY

The embodiments disclosed herein meets these and other needs by providing systems and methods for identifying germinated seeds on a soilless growth medium exposed to germination conditions. The methods and systems capture a first image of one or more seeds, germinated seeds, or any combination of these exposed to germination conditions atop the soilless growth medium and convert the first image into a binary image. Initial features corresponding to the one or more seeds, germinated seeds, or any combination of these can be identified in the binary image and these corresponding initial features can be cropped from the first image to form initial cropped feature images. The methods and system can determine an average area of the identified initial features in the initial cropped feature images and divide each initial cropped feature image by a scaled value of the average area of the initial features to form one or more final cropped feature images. The final cropped feature images can be input into a deep learning model trained on images of germinated and non-germinated seeds and a calculation can be made of the number of germinated seeds, non-germinated seeds, or any combination of these atop the soilless growth medium based on an output of the deep learning model.

Embodiments of the disclosure relate to a method of determining seed germination on a soilless growth medium that can include the acts or steps of capturing a first image of one or more seeds, germinated seeds, or any combination of these exposed to germination conditions atop the soilless growth medium, converting the first image into a binary image, and identifying initial features corresponding to the one or more seeds, germinated seeds, or any combination of these in the binary image. Each initial feature may be identified in the binary image by a number of interconnected white or black pixels above a threshold value, determining the coordinates of a rectangle that encloses the interconnected white or black pixels above the threshold value, and applying the coordinates of each rectangle encompassing the initial features to the first image. The coordinates of the rectangle can be used to crop the initial features from the first image to form initial cropped feature images. The method can further include determining an average area of the initial features in the initial cropped feature images and dividing each initial cropped feature image by a scaled value of the average area of the initial features to form one or more final cropped feature images. The method can further include the acts or steps of inputting each final cropped feature image from the first image into a deep learning model previously trained on images of germinated and non-germinated seeds and determining whether each final cropped feature image from the first image is a germinated seed or a non-germinated seed based on an output of the deep learning model. The output from the deep learning model can further be used to create or generate a germination profile that can be based on the number of germinated seeds, non-germinated seeds, or any combination of these atop the soilless growth medium.

Further embodiments of the disclosure are directed to a system for monitoring seed germination on a soilless growth medium wherein the system includes a soilless growth medium comprising one or more seeds, germinating seeds, or any combination of these atop the soilless growth medium. An image capturing device of the system can be positioned to measure a germination status of the one or more seeds on the soilless growth medium exposed to germination conditions and a processor can be coupled to the image capturing device. In the system, the processor may be further operable to capture a first image of one or more seeds, germinated seeds, or any combination of these exposed to germination conditions atop the soilless growth medium and convert the first image into a binary image. The processor can be operable to analyze the binary image to identify initial features corresponding to the one or more seeds, germinated seeds, or any combination of these in the binary image and then utilized to crop the corresponding initial features from the first image to form initial cropped feature images. The processor can be operable to determine an average area of the initial features in the initial cropped feature images and divide each initial cropped feature image by a scaled value of the average area of the initial features to form one or more final cropped feature images. The processor can be operable to input each final cropped feature image into a deep learning model trained on images of germinated and non-germinated seeds and calculate the number of germinated seeds, non-germinated seeds, or any combination of these atop the soilless growth medium based on an output of the deep learning model. The processor can be further operable to create a germination profile and determine whether to place the soilless growth medium in a grow chamber based on the germination profile.

In some embodiments of the disclosure, the soilless growth medium can be a textured soilless growth medium that can be a cloth that can have a napped top surface, or can have an upwardly or outwardly directed napped top surface. In some embodiments the textured soilless growth medium can include an outwardly directed nap on both the top and bottom surfaces, and in some embodiments, the textured soilless growth medium can further include stem fragments from prior use. In other embodiments the textured soilless growth medium is a fabric that can be a loose woven or non-woven porous substrate. In some embodiments the textured soilless growth medium comprises a layer of a paper and layer of a loose woven or non-woven porous substrate atop the layer of paper. In some embodiments of the disclosure, the textured soilless growth medium is positioned on a frame to form a flat. The flat can further comprises a light barrier layer atop the soilless growth medium and seeds exposed to germination conditions can be positioned in openings in the light barrier layer.

Embodiments of the disclosure can also include a computer program product having a set of computer instructions stored a computer readable medium, the computer instructions including instructions executable by a processor to receive a first image of one or more seeds, germinated seeds, or any combination of these exposed to germination conditions atop a soilless growth medium, instructions to convert the first image into a black and white binary image, and instructions to capture a first image of one or more seeds, germinated seeds, or any combination of these exposed to germination conditions atop the soilless growth medium. The computer instructions can further convert the first image into a binary image, include instructions that can identify initial features corresponding to the one or more seeds, germinated seeds, or any combination of these in the binary image and crop the corresponding initial features from the first image to form initial cropped feature images. The computer product program can have instructions used in determining an average area of the initial features in the initial cropped feature images and instructions for dividing each initial cropped feature image by a scaled value of the average area of the initial features to form one or more final cropped feature images. The computer product program set of instructions can include instructs to input each final cropped feature image into a deep learning model trained on images of germinated and non-germinated seeds and calculate the number of germinated seeds, non-germinated seeds, or any combination of these atop the soilless growth medium based on an output of the deep learning model.

The selection and training of the deep learning model as described herein results in improved speed and accuracy in monitoring and/or determining seed germination on a soilless growth medium.

Advantageously the system and method of the disclosure can distinguish seeds, germinated seeds and non-germinated seeds from the soilless growth media. In some embodiments, the soilless growth medium may have texture, like an outwardly directed nap or be formed from materials with loosely woven threads, similar in size to the seeds. In some embodiments, the soilless growth medium may optionally include stem fragments remaining from previous use of the soilless growth medium for plant development and harvesting.

BRIEF DESCRIPTION OF THE DRAWINGS

The drawings accompanying and forming part of this specification are included to depict certain aspects of the disclosure. A clearer impression of the components and operation of systems and methods provided with the disclosure, will become more readily apparent by referring to the exemplary, and therefore non-limiting, embodiments illustrated in the drawings, wherein identical reference numerals designate the same components. The embodiments are illustrated by way of example and should not be construed to limit the present disclosure. Note that the features illustrated in the drawings are not necessarily drawn to scale.

FIG. 5A and FIG. 5C) as an RGB model image with the initial features cropped and enclosed by rectangular boarders.

Figure 1:
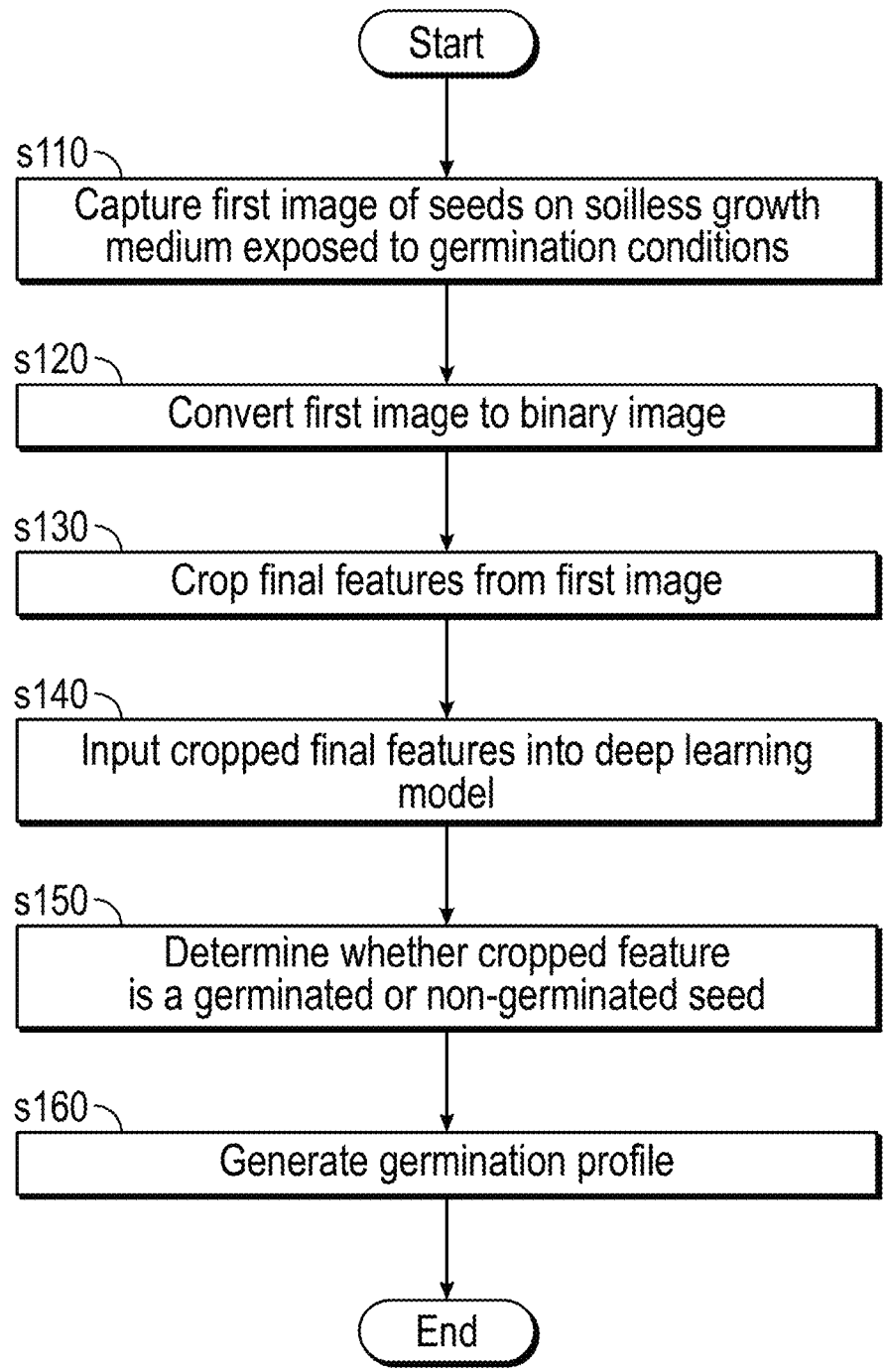
FIG. 1 is a flowchart that illustrates a method of monitoring seeds on a soilless growth medium or substrate exposed to germination conditions according to an embodiment of the disclosure.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements

DETAILED DESCRIPTION

In the following description, it is understood that terms such as "top," "bottom," "outward," "inward," and the like are words of convenience and are not to be construed as limiting terms. Reference will now be made in detail to embodiments of the disclosure, which are illustrated in the accompanying figures and examples. Referring to the drawings in general, it will be understood that the illustrations are for the purpose of describing particular embodiments of the disclosure and are not intended to limit the same.

Whenever a particular embodiment of the disclosure is said to comprise or consist of at least one element of a group and combinations thereof, it is understood that the embodiment may comprise or consist of any of the elements of the group, either individually or in combination with any of the other elements of that group.

Systems and methods of the disclosure can be used to determine seed germination on soilless growth media at an early stage of germination. In some embodiments, a germination profile can be generated when radicles first appear and few or no hypocotyls are visible. The systems and methods of the disclosure can improve the accuracy of seed germination detection on the soilless media and saves time (seedlings do not have to be developed) for the grower by enabling the placement of suitably germinated seeds on the soilless growth medium into a growth chamber or grow tower for development.

In some embodiments, machine vision can be used as part of a method for determining seedlot vigor including the steps of: (a) acquiring a first image of each seed; (b) acquiring one or more additional images of the root at times later than first image; and (c) measuring growth rate of each germinated seedling by electronic image analysis to determine seedlot vigor. In this method, an apparatus including a rotating rack system containing a plurality of germination boxes is placed inside an environmentally-controlled growth chamber. Separated seeds are placed in an array on layers of blotter paper in the germination boxes. The blotter paper is new and does not contain texture or plant stems remaining from previous harvest or use. However, the rotating rack system is expensive and complicated to build and multiple images on different days, two or more, are required to determine the seedlot vigor. As the germination boxes rotate past a camera, individual seeds are located in each box by searching for "seedlike" (i.e., proper size, shape and color) objects and saving the x:y coordinates of the center of each object found to the image database. On Day 3 of germination treatment, an initial germination region of interest is drawn around the center of the seed, i.e. seed centroid, with a circle radius of about 2 mm greater than the radius of the seed. The presence of a root within the initial germination region of interest are then determined. Thus, all roots which are 2 mm long will touch the region of interest and thus that seed will be considered germinated.

Machine vision can also be used to determine seedlot vigor based on an analysis of a scanned images of a plurality of seedlings grown from seeds. Both hypocotyl and radicle length of the seedlings are analyzed and used to determine the separation point between the two for each seedling and the determination of seed vigor. The seedling analysis software can also separate overlapped seedlings using a simulated annealing technique. This method requires additional time for development of the seedlings from the seeds.

One embodiment of the disclosure that avoids the drawbacks of the aforementioned embodiments is a method of determining seed germination on a soilless growth medium. The method can include the acts or steps that include capturing a first image of one or more seeds, germinated seeds, or any combination of these exposed to germination conditions atop the soilless growth medium. The method can further include converting the first image into a binary image and identifying initial features corresponding to the one or more seeds, germinated seeds, or any combination of these in the binary image, and cropping the corresponding initial features from the first image to form initial cropped feature images. Acts or steps in the method may also include determining an average area of the initial features in the initial cropped feature images and dividing each initial cropped feature image by a scaled value of the average area of the initial features to form one or more final cropped feature images. The final cropped feature images can be input into a deep learning model trained on images of previously identified germinated and non-germinated seeds. An output of the deep learning model can be a determination of whether the final cropped feature image is a germinated seed or not. The outputs from the deep learning model can be used in calculating the number of germinated seeds, non-germinated seeds, or any combination of these atop the soilless growth medium.

Another embodiment of the disclosure that avoids the drawbacks of the aforementioned embodiments is a system for monitoring seed germination on a soilless growth medium that can include a soilless growth medium having one or more seeds, germinating seeds, or any combination of these atop the soilless growth medium. The system can include an image capturing device positioned to measure a germination status of the one or more seeds exposed to germination conditions on the soilless growth medium, and the system can include a processor. The system processor can optionally be coupled to the image capturing device. The processor can be operable to capture a first image of one or more seeds, germinated seeds, or any combination of these exposed to germination conditions atop the soilless growth medium. The processor can be further operable to convert the first image into a binary image, identify initial features corresponding to the one or more seeds, germinated seeds, or any combination of these in the binary image, and crop the corresponding initial features from the first image to form initial cropped feature images. The processor can be further operable to calculate an average area of the initial features in the initial cropped feature images based on the number of interconnected white or black pixels. Each initial cropped feature image can be divided by a scaled value of the average area of the initial features to form one or more final cropped feature images. One or more, and in some cases all, of the final cropped feature images can be input into a deep learning model trained on images of germinated and non-germinated seeds. The deep learning model can be used to calculate the number of germinated seeds, non-germinated seeds, or any combination of these atop the soilless growth medium based on an output of the deep learning model. The output from the deep learning model can be used, optionally by the processor, to determine a germination profile for the seeds on the soilless medium. The processor can use the germination profile to determine whether the germination profile meets a criteria to place the soilless growth medium into a growth chamber.

In embodiments of the disclosure, plants can be developed from germinated seeds utilizing a soilless growth medium. The seeds can be positioned on an upper surface of the soilless growth medium and the roots of the developing plants penetrate through the soilless growth medium. The seeds on the soilless growth medium can be arranged in a pattern, for example a matrix of rows and columns, or the seeds may be distributed randomly. In some embodiments, adjacent seeds on the soilless growth medium do not touch.

The soilless growth medium in embodiments of the disclosure can be porous and can include woven and non-woven materials such as cloth, fabric, spun microfibers and nanofibers, or other textiles that permit root penetration. Combinations of textiles, for example paper and cloth can also be used. In some embodiments of the method and system, the soilless growth medium is a cloth, fabric, or textile that has a texture which can have a scale or feature size similar to the size of the seeds.

In some embodiments, the textured cloth can have a napped top surface or the textured cloth can have an upwardly (outwardly from the surface) directed napped top surface. In some embodiments, the upper and lower surfaces of the cloth are napped or the upper and lower surfaces have an outwardly directed nap. The textured soilless growth medium can also be a textured fabric that is a loose woven material or non-woven porous material such as a gauze. In some embodiments, the textured soilless growth medium can further include stem fragments on top of or protruding from the soilless growth medium. The stem fragments can be from previous plant development and harvesting from the soilless growth medium. Advantageously in embodiments of the disclosure, the feature identification from the binary image and germinated seed identification from the deep learning model distinguish the seeds exposed to germination conditions from the texture of the soilless growth medium and/or stem fragments remaining on the soilless growth medium.

In some embodiments, the textured soilless growth media can be a resilient media as disclosed in "Resilient Plant Development Media", Mark Rosen, U.S. Ser. No. 63/048,394, filed Jul. 6, 2020, and incorporated herein by reference in its entirety. The resilient soilless growth medium can have a first layer that includes a plurality of adjacent resilient strands having an initial orientation, the resilient strands constrained at two or more separate positions across a length of the strands. The media has a second layer that includes a plurality of adjacent resilient strands having an initial orientation, the resilient strands constrained at two or more separated positions. The second layer is in a stacked relation relative to the first layer and the strands of the first layer and the strands of the second layer are in a non-aligned orientation relative to each other. The resilient media can have non-absorbent strands can have features and/or texture including one or more nubs, appendages, or extensions that can protrude into the opening between strands. The texture of the resilient strands including the strand diameter, one or more nubs, appendages, or extensions that can protrude into the opening between strands can be substantially on the same scale or size as the seeds.

In some embodiments of the disclosure, the soilless growth medium can be positioned on a frame or other support to form a flat and one or more seeds can be distributed atop the soilless growth medium. In still other embodiments, the flat further can comprise a light barrier layer with openings, the light barrier layer can be atop the soilless growth medium and the seeds exposed to germination conditions can be positioned in openings in the light barrier layer. The contents of International Patent Application PCT/US2019/014561, titled "MULTI-LAYER SEED GERMINATION AND PLANT DEVELOPMENT MEDIA", and incorporated herein by reference in its entirety, describes a non-limiting example of a flat having a light barrier layer with openings that can be positioned atop a soilless growth medium and that can be used in embodiments of the present disclosure.

Another embodiment of the disclosure can be a system for monitoring seed germination on a textured soilless growth medium. The system can include a textured soilless growth medium comprising one or more seeds, germinating seeds, or any combination of these exposed to germination conditions atop the soilless growth medium. The textured soilless growth medium can have a top surface that is napped or that has an upwardly directed nap. The system can include an image capturing device positioned to measure a germination status of the one or more seeds exposed to germination conditions on the textured soilless growth medium, and the system can include a processor. The system processor can optionally be coupled to the image capturing device. The processor can be operable to capture a first image of one or more seeds, germinated seeds, or any combination of these exposed to germination conditions atop the textured soilless growth medium. The processor can be further operable to convert the first image into a binary image, identify initial features corresponding to the one or more seeds, germinated seeds, or any combination of these in the binary image, and crop the corresponding initial features from the first image to form initial cropped feature images. The processor can be further operable to calculate an average area of the initial features in the initial cropped feature images based on the number of interconnected white or black pixels. Each initial cropped feature image can be divided by a scaled value of the average area of the initial features to form one or more final cropped feature images. One or more, and in some cases all, of the final cropped feature images can be input into a deep learning model trained on images of germinated and non-germinated seeds. The deep learning model can be used to calculate the number of germinated seeds, non-germinated seeds, or any combination of these atop the textured soilless growth medium based on an output of the deep learning model. The output from the deep learning model can be used, optionally by the processor, to determine a germination profile for the seeds on the textured soilless growth medium. The processor can use the germination profile to determine whether the germination profile meets a criteria to place the textured soilless growth medium with germinated seeds into a growth chamber.

Embodiments of the disclosure can be used to convert an initial image, which can be an RGB model digital image, of the soilless growth medium with germinated and non-germinated seeds, optional stem fragments, and optional soilless growth medium texture, into a binary image. The binary image can be further analyzed to crop germinated or non-germinated seeds from the stems and soilless growth medium morphology by using thresholding, and pixel counting. The cropped images of seeds can be input into a deep learning model to characterize the images to determine a germination profile.

In some embodiments, the initial image of the soilless growth medium with germinated and non-germinated seeds, optional stem fragments, and optional soilless growth medium texture can be an RGB model image. Other image models can also be used for the initial image. This initial RGB model image can be taken on a portion or the entire soilless growth medium. The initial model image can be transformed into an HSV image using standard transformation equations. The transformation to the HSV model image may improve contrast between the germinated seeds and non-germinated seeds, the background cloth soilless growth medium and the texture of the medium.

To standardize the HSV image output, the HSV image can be further transformed into a gray scale image using an HSV to gray scale thresholding criteria. The grayscale image can be converted into a black and white binary image, with seeds colored black, using a gray scale to binary image thresholding criteria. The black and white binary image can be inverted to give a white and black binary image with the seeds colored white.

The one or more initial features remaining in the white and black binary image can be identified using an object detection algorithm based on a number of interconnected white or black pixels in the binary image. A thresholding value of interconnected pixels can be used to eliminate noise and false positives from the image conversions, reduce or eliminate stems remaining on the growth medium from previous growing cycles, remove edges of a mask, and remove other non-seed structures in the image. The threshold number of pixels can depend on the type of seed such that a small seed can have a lower threshold of interconnected pixels than for example a larger seed. The threshold number of interconnected pixels can for example be set to 100 interconnected white pixels, set to 150 interconnected white pixels, or set to any value of interconnected pixels between 100 pixels and 150 pixels. For example scanned binary images with initial features having a number of interconnected white pixels below 150 can be excluded as being a seed or germinated seed or the corresponding pixel values of the feature set to black.

Features having over the threshold number of interconnected pixels, for example interconnected white pixels, can be treated as one object or feature by the object detection algorithm and the co-ordinates (position/location) of a rectangle encompassing that feature in binary image may be captured. The coordinates of the rectangles for the features can be applied as seed cropping boundaries to the RGB image, the HSV image, or the binary image when the dimensions and resolution of these images are the same. The cropped features from the first image, which can be the RGB image, corresponding to these coordinates can provide initial cropped feature images.

After cropping each initial feature image, i.e. a germinated seed or non-germinated seed, from the first image (RGB image), the area of each initial feature can be determined and an average area of all the initial features can also be determined. The area of each initial feature in a cropped rectangle may be determined by summing the number of interconnected white pixels comprising the initial feature. The average area of the initial cropped features can be determined by summing the areas of the individual initial features and dividing by the number of initial features used in the sum.

Figure 8:
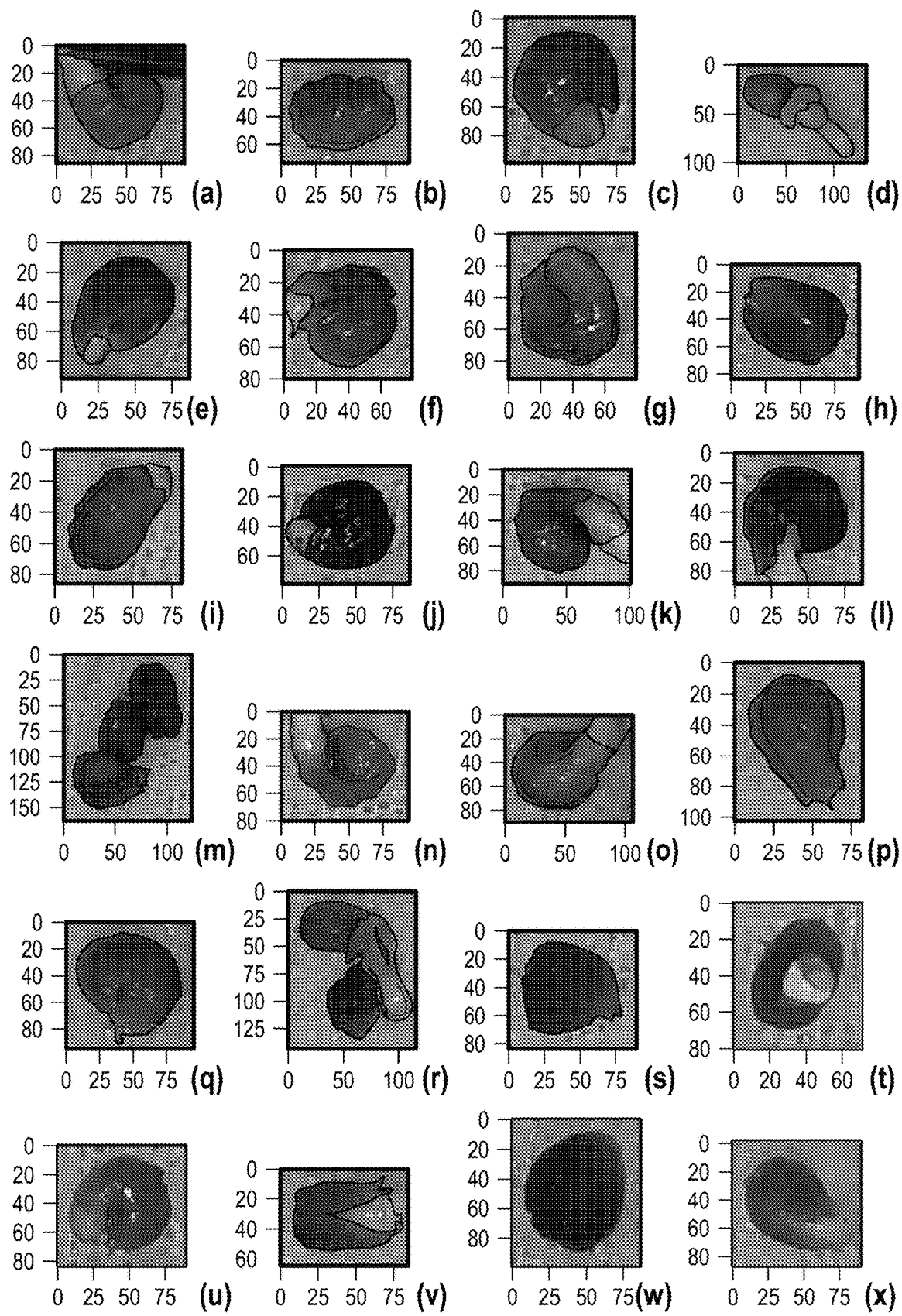
FIG. 8 shows a representative set of initial cropped features images (a)-(x).

Each initial cropped feature image, may include one or more seeds or germinated seeds (e.g. FIG. 8(*m*) or 8(*r*)). These initial cropped features can be further divided by a scaled value of the average area of the initial cropped feature images and used to produce one or more final cropped feature images. For example, if after cropping, the initial cropped feature image area was less than 1.5 times the average initial cropped feature area, do not divide the image; after cropping, if the initial cropped feature image area was greater than 1.5 times the average initial cropped feature area, divide the image in two separate images; after cropping, if the cropped initial cropped feature image area was greater than 2.5 times the average initial cropped feature area, divide the image into three separate images; after cropping, if the cropped initial cropped feature image area was greater than 3.5 times the average initial cropped feature area, divide the image into four separate images, and so on. Once separated, the individual images can be input to the deep learning model.

In another example with different scaling factors, if after cropping, the initial cropped feature image area was less than 1.7 times the average initial cropped feature area, do not divide the image; after cropping, if the initial cropped feature image area was greater than 1.7 times the average initial cropped feature area, divide the image in two separate images; after cropping, if the cropped initial cropped feature image area was greater than 2.7 times the average initial cropped feature area, divide the image into three separate images; after cropping, if the cropped initial cropped feature image area was greater than 3.7 times the average initial cropped feature area, divide the image into four separate images, and so on. Once separated, the individual images can be input to the deep learning model.

In embodiments of the disclosure, each final cropped feature image from the first image can be input into a trained deep learning model that can comprise a convolution neural network (CNN). The convolution neural network can include convolution layers, dense layers, pooling layers, an activation layer, or any combination of these. In some embodiments the activation layer is a sigmoid function. The deep learning model can be one that was previously trained on cropped feature images based on the same image model (RGB, HSV, etc.), lighting conditions, soilless medium, seed type, and samples of germinated and non-germinated seeds atop the soilless growth medium or textured soilless growth medium. Images used for determining a germination profile and/or for deep learning model training may be illuminated under substantially the same lighting spectrum and intensity. In some embodiments of the disclosure the seeds atop the soilless growth medium can be illuminated using white light LED source.

The trained deep learning model can be used to determine whether each identified final cropped feature image from the first image is a germinated seed or a non-germinated seed based on an output of the deep learning model. The output from the deep learning model can be used to generate a germination profile (estimated crop yield, germination map, percent germination) of a number of germinated seeds, non-germinated seeds, or any combination of these atop the soilless growth medium. In some embodiments, the method can further include a criteria for determining whether to position the soilless growth medium in a growth chamber based on the germination profile. For example if greater than 85% of the identified features correspond to germinated seeds, then place the growth medium with seeds in the growth chamber. In another example of a criteria, place the soilless growth medium with germinated seeds in a growth chamber if the growth medium does not contain an enclosed area with non-germinated seeds that is greater than 10% of the area of the soilless growth medium. The germination profile may also be used to predicted plant density on the soilless growth medium, predict a final harvest yield, predict a harvest time, or be used to predict any combination of these.

In some embodiments, the training set used for the deep learning model may be retrieved from a library of images of different seed varieties and/or different soilless growth media. The training set inputs (images) from the library may be labeled based on a user input regarding the status of the seed exposed to germination conditions on a particular soilless, and in some embodiments textured, growth medium.

Embodiments of the disclosure relate to the determination of a germination profile of a soilless growth medium that has seeds on a top surface and exposed to germination conditions. The germination profile can be used to determine whether to place the soilless growth medium in a growth chamber and whether to commit energy resources and grow tower space to further develop the germinated seeds on the soilless growth medium. The plants from the germinated seeds can be developed under aeroponic or hydroponic conditions to a harvest stage. The germination profile can be used to estimate the yield of plants developed on the soilless growth medium.

Advantageously, embodiments of the disclosure enable determination of a germination profile without the need for repeated images of seeds on the soilless growth medium to be taken on different days or times. Also advantageous is the ability of the soilless growth medium with seeds exposed to germination conditions to be used in a growth chamber directly following determination of the germination profile. These can save the cost of equipment used to move germination boxes past an imager, reduce the memory required to store images taken on multiple days, save the cost of seeds because they are used to grow plants, and saves on the cost of blotter paper which would normally be discarded after germination use. Embodiments of the disclosure improves the accuracy of plant yields calculated for the soilless growth medium with seeds.

In embodiments of the disclosure, the term "developing plant(s)" can refer to one or more germinating seeds, one or more seedlings with or without true leaves, one or more growing plants, or any combination of these that are on a generally top surface of the growth medium.

In embodiments of the disclosure, the seeds maintained under germination conditions, or exposed to germination conditions, are seeds capable of imbibition, seed coat (testa) rupture, and the emergence of an embryonic root (radicle) which can grow into the soilless growth medium. Depending on the seed type and duration of exposure of the seeds to the germination conditions, the cotyledon can emerge and produces the growing shoot's first leaves. Depending on the extent of germination, an emerging seed can include an epicotyl (embryonic shoot), hypocotyl (embryonic stem) and developing roots. Germination conditions in embodiments of the disclosure, include any combination of suitable temperature, adequate water and or humidity, oxygen, and optionally light that can result in the germination of viable seeds. The soilless growth medium 460 with germinated and non-germinated seeds thereon may be placed in a germination chamber or cart (e.g., FIGS. 4 and 410) where these conditions can be controlled and modified.

In some embodiments, the system can further include a visual display device to display notifications, images, cropped feature images, germination profile(s), etc. For example, the notification may be transmitted (e.g., via the processor) identifying whether one or more feature cropped image(s) is a germinated seed or a non-germinated seed based on an output of the deep learning model and/or the germination profile.

Example 1

This example illustrates capturing images of seeds exposed to germination conditions atop a soilless growth medium and identifying features in the image.

The soilless growth medium is a cloth that has an outwardly directed nap on surfaces of the cloth. Plant stems remaining on the cloth from previous harvests are also present.

The seeds are placed on water wet cloth mounted on top of a metal frame to form a flat. The flat with the cloth is wet with water, and seeds are deposited on the top surface of the cloth. The seeds are exposed to germination conditions by the water wetting of the cloth and seeds, placement of the flat in an air permeable enclosure (with limited light), and by keeping the seeds and cloth of the flat at a temperature of about 20 C for 3 days.

Figure 5A:
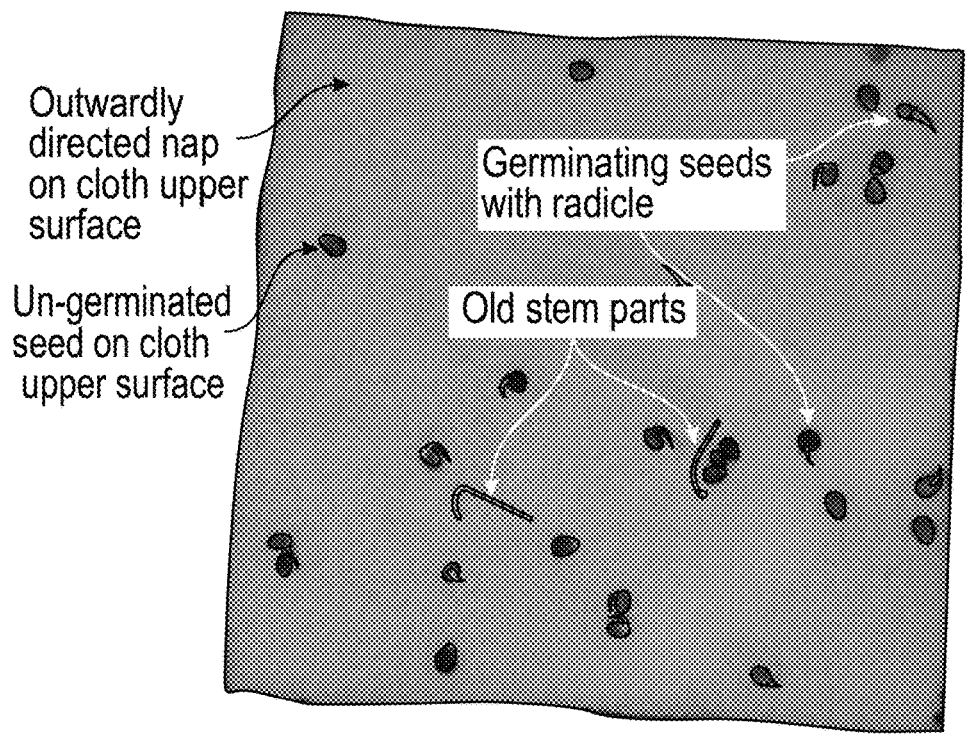
FIG. 5A is an example of a captured RGB model first image of one or more seeds, germinated seeds, stem fragments, or any combination of these exposed to germination conditions atop a soilless growth medium.

At a predetermine time interval of 3 days, a digital camera is used to capture an image of a masked portion of the seeds on the cloth that were exposed to the germination conditions. The camera captures a red, green, blue (RGB) model digital image of the cloth soilless growth medium with any non-germinated seeds, germinated seeds, and remaining plant stems, as illustrated in FIG. 5A. The first RGB image is transformed into an HSV image (e.g., FIG. 5B) to contrast the germinated seeds and non-germinated seeds from the background cloth soilless growth medium and texture of the medium. The upwardly directed nap of the cloth is effectively removed by the transformation from the RGB model to the HSV image model, the soilless growth medium appears a substantially uniform violet. Thus, in practice, the cloth in FIG. 5B would appear a substantially uniform violet, and portions of the old stem and root parts, non-germinated seeds, and germinated seeds and radicles remain appear greenish in image.

To standardize the HSV image output, the HSV image is further transformed into a gray scale image using an HSV to gray scale thresholding criteria. The result is shown in the grayscale image in FIG. 6A. In the grayscale image of FIG. 6A, the germinated seeds and non-germinated seeds and some old stems and roots are depicted as being light colored on the darker cloth.

Figure 6A:
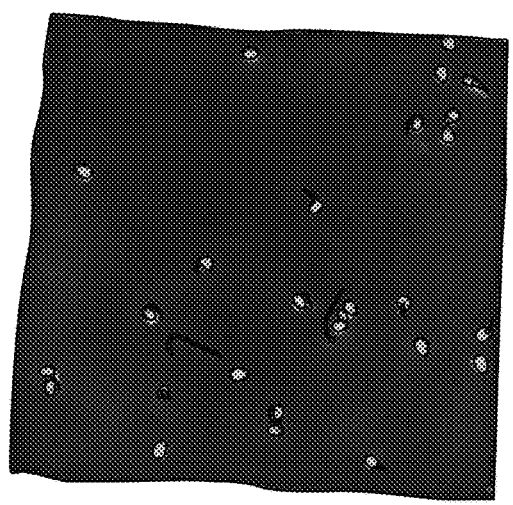
FIG. 6A is a gray-scale image of the first image in HSV model in FIG. 5B after a transformation using an HSV to gray scale color thresholding value.
Figure 6B:
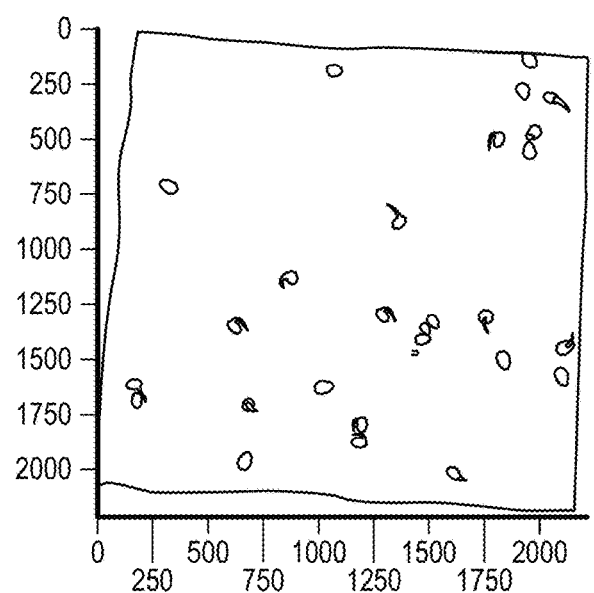
FIG. 6B is a binary image of the gray scale image in FIG. 6A after a transformation using a gray scale to binary image thresholding value.
Figure 6C:
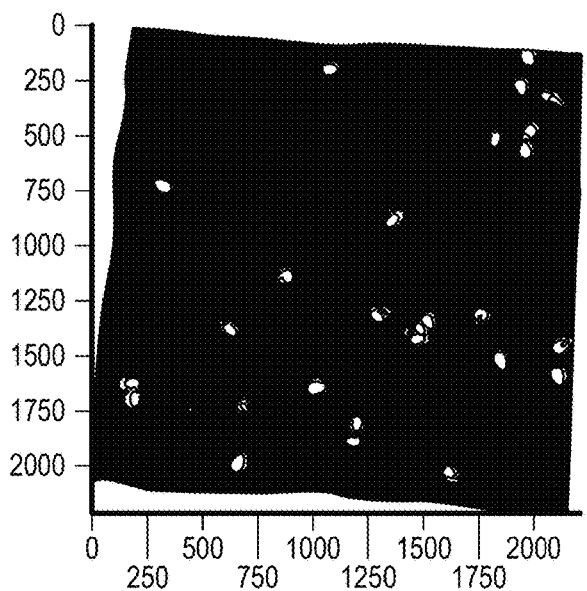
FIG. 6C is the inverted image of FIG. 6B.

The grayscale image (e.g., FIG. 6A) is converted into a black and white binary image shown in FIG. 6B, with seeds colored black, using a gray scale to binary thresholding criteria. FIG. 6B illustrates that the stems were partially removed from the grayscale image by converting it into the black and white binary image. This black and white binary image was inverted to give a white and black binary image with the seeds colored white, as shown in FIG. 6C.

Figure 7A:
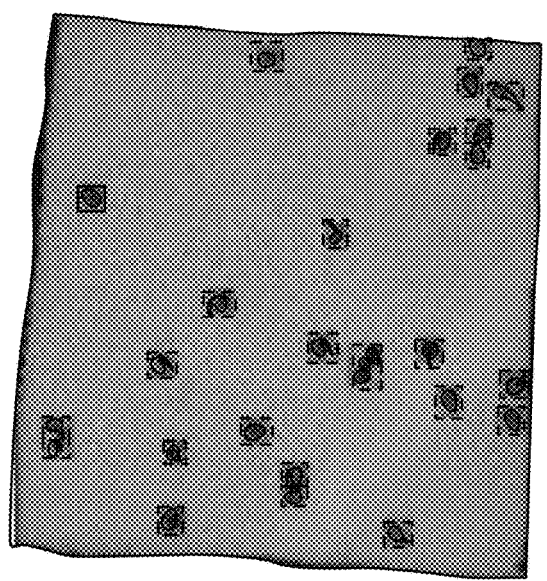
FIG. 7A is representation of the first image (e.g.

The one or more features remaining in the white and black binary image are identified using an object detection algorithm and a number of interconnected white pixels. The connected white pixels are treated as one object or feature by the object detection algorithm and the co-ordinates (position/location) of that feature in binary image captured. To avoid tiny white dots (noise) which are not seeds, there is a pre-defined threshold area so that if the area of the detected feature exceeds that threshold value then only consider the feature as a germinated seed or non-germinated seed. The threshold in the example is 150 white pixels, and features having a number of interconnected pixels below 150 pixels are not considered to be a seed or germinated seed. For each feature meeting the threshold, the coordinates of a cropped rectangular area that contained the feature in the binary image are determined. These coordinates were applied as seed cropping boundaries to the RGB image, but the coordinates could also be applied to the HSV image, or the binary image when the dimensions and resolution of these images are the same as the RGB and grayscale images. This is illustrated in FIG. 7A (RGB), FIG. 7B (HSV) and FIG. 7C (Gray). The cropped feature from the first image corresponding to these coordinates provided initial cropped feature images as shown in FIG. 8. These images illustrate examples of cropped feature images from the masked section of the soilless growth medium and were part of the input for training set used for the deep learning model. In the image above of the masked section, about 24 features were present.

After cropping each initial feature image, i.e. a germinated seed or non-germinated seed, from the first image (RGB image), the area of each initial feature is determined and an average area of all the initial features is also determined. The area of each initial feature in a cropped rectangle is calculated by summing the number of interconnected white pixels comprising the initial feature. The average area of all the initial cropped features is calculated by summing the areas of the individual initial cropped feature images and dividing by the number of initial cropped feature images used in the sum.

Each initial cropped feature image is subsequently divided by a scaled value of the average area of the initial cropped features to form one or more final cropped feature images. Where the initial cropped feature image area is less than 1.5 times the average area of the initial cropped features, count the initial cropped feature image as 1 seed; after cropping, if the initial cropped feature image area is greater than 1.5 times the average area of the initial cropped features, count the initial cropped feature image as two seeds and divide the initial cropped feature image in two parts; after cropping, if the initial cropped feature image area is greater than 2.5 times the average area of the initial cropped feature, count the initial cropped feature image as 3 seeds and partition the initial cropped feature image into three parts, and so on. Once separated, the individual images are input to the deep learning model.

The entire flat of seeds exposed to germination conditions on the soilless growth medium totals about 1657 seeds/features. The cropped RGB feature images from the test flat are visually analyzed and categorized as either being germinated or as being non-germinated. The visual analysis results in 848 germinated and 809 non germinated seeds being identified from the cropped RGB image features. About 80% of these manually identified images are used to develop/train a deep learning model (see Example 2) and the remaining approximately 20% of the images are used to verify the developed deep learning models.

Example 2

This example illustrates the development of deep learning models that were trained on cropped features of images and the accuracy of the models to identify germinated and non-germinated seeds exposed to germination conditions on a textured soilless growth medium, as described in Example 1 above.

A total of 1657 cropped feature images from Example 1 are identified (e.g., manually, visually, or using image analysis) as either being germinated (848) or non-germinated (809) seeds. About 80 percent of these cropped images are used to train and evaluate various deep learning models (described below). The remaining approximately 20% of the images are used to evaluate the accuracy of various deep learning models.

One cropped RGB figure at a time from the total germinated and non-germinated seed images (about 678 germinated and about 647 non-germinated) are passed to each deep learning model to extract or filter high level features from the image. These features are input into various combinations of convolution layers, pooling layers, dense layers, activation layers and combinations of these to determine whether the cropped feature image represent a germinated seed or a non-germinated seed. The output from the deep learning model produce a binary output or classification of either germinated seed or non-germinated seed for each RGB image.

Once a deep learning model is trained, the model is tested on the remaining 20% of the images and an accuracy of the model is reported (for example, the accuracy of Model #1 below is 62.5% in identifying germinated or non-germinated seeds from the remaining 20% of the known images from Example 1).

Deep learning models with dense layers in this example use iteration to change the weighting constants for the neurons of the dense layer to optimize accuracy for the model. An EPOCH of 20 was used on the 1657 cropped features in one model. A larger number, for example 100, or smaller number, of EPOCHs were possible to use. An Epoch refers to one cycle through the full training dataset.

Model #1. An initial scan or convolution layer of the deep learning model extracted 64 filter/features from each feature image, this was followed by 1 activation layer where the extracted features from the convolution layer were bound to linearize them and then this result passed to a dense layer with 64 neurons, followed by a max pooling layer (2×2), after which the results were passed to a final activation layer which was a sigmoid function. This model achieved an accuracy (a germination profile) of 62.5% in identifying germinated seeds and non-germinated seeds from the feature images compared to the known input determined visually.

Model #4. An initial convolution scan of the model extracted 64 filter/features using a kernel size 5,5 from each feature image. These extracted features from the convolution layer were bound to linearize them and then passed to a dense layer having 64 neurons. The output from the dense layer which was input to a max pooling layer (2×2), followed by a dense layer with 1 neuron, and the final result input to a final sigmoid activation layer. This model achieved an accuracy (a germination profile) of 68.75% in identifying germinated seeds and non-germinated seeds from the feature images compared to the known input determined visually.

Model #10. An initial the model extracted 64 filter/features from each feature image in a first convolution layer. The extracted features were bound to linearize them using an activation layer and this result input a first dense layer with 64 neurons and then a second dense layer with 32 neurons. The output from the second dense layer was passed to a sigmoid activation layer. This model achieved an accuracy (a germination profile) of 74% in identifying germinated seeds and non-germinated seeds from the feature images compared to the known input determined visually.

Model #13. An initial scan of the model extracted 32 filter/feature in a first convolution layer and the extracted features were bound to linearize them using an activation layer. The output from the activation layer was then pass to a second convolution layer where the extracted features were again bound and passed to a max pooling layer. The output from the max pooling layer was input into a first dense layer with 64 neurons, into a second dense layer with 32 neurons, and then into a third dense layer with 1 neuron and finally to a sigmoid activation layer. This model achieved an accuracy (a germination profile) of 72.4% in identifying germinated seeds and non-germinated seeds from the feature images compared to the known input determined visually.

Model #23. An initial scan of the model extracted 16 filter/features from each feature image in a first convolution layer and the extracted features were bound to linearize them using a first activation layer. The output from the first activation layer was then passed to a $2^{nd}$ convolution layer which extracted 32 filter/features which were subsequently bound to linearize them using a second activation layer. The output from the second activation layer was then passed to a $3^{rd}$ convolution layer that extracted 64 filter/features which were bound to linearize them using a third activation layer. The output from the third activation layer was then passed to a $4^{th}$ convolution layer which extracted 128 features and the extracted features were bound to linearize them using a fourth activation layer. The output from the fourth activation layer was then passed to a $5^{th}$ convolution layer that extracted 256 features and the extracted features were bound to linearize them using a fifth activation layer. The output from the fifth activation layer was then passed to a $6^{th}$ convolution layer that extracted 512 features which were bound to linearize them using an $6^{th}$ activation layer. The output from the sixth activation layer was then passed to a first dense layer with 512 neurons followed by an activation layer. The output from this was passed to a second dense layer 1024 neurons and a subsequent activation layer. This output was passed to a third dense layer with 21240 neurons, then an activation layer and then a final dense layer with 1 neuron. The output from the final dense layer was passed to a sigmoid activation layer. This model achieved an accuracy (a germination profile) of 87.86% in identifying germinated seeds and non-germinated seeds from the feature images compared to the known input determined visually.

Example 3

Figure 9:
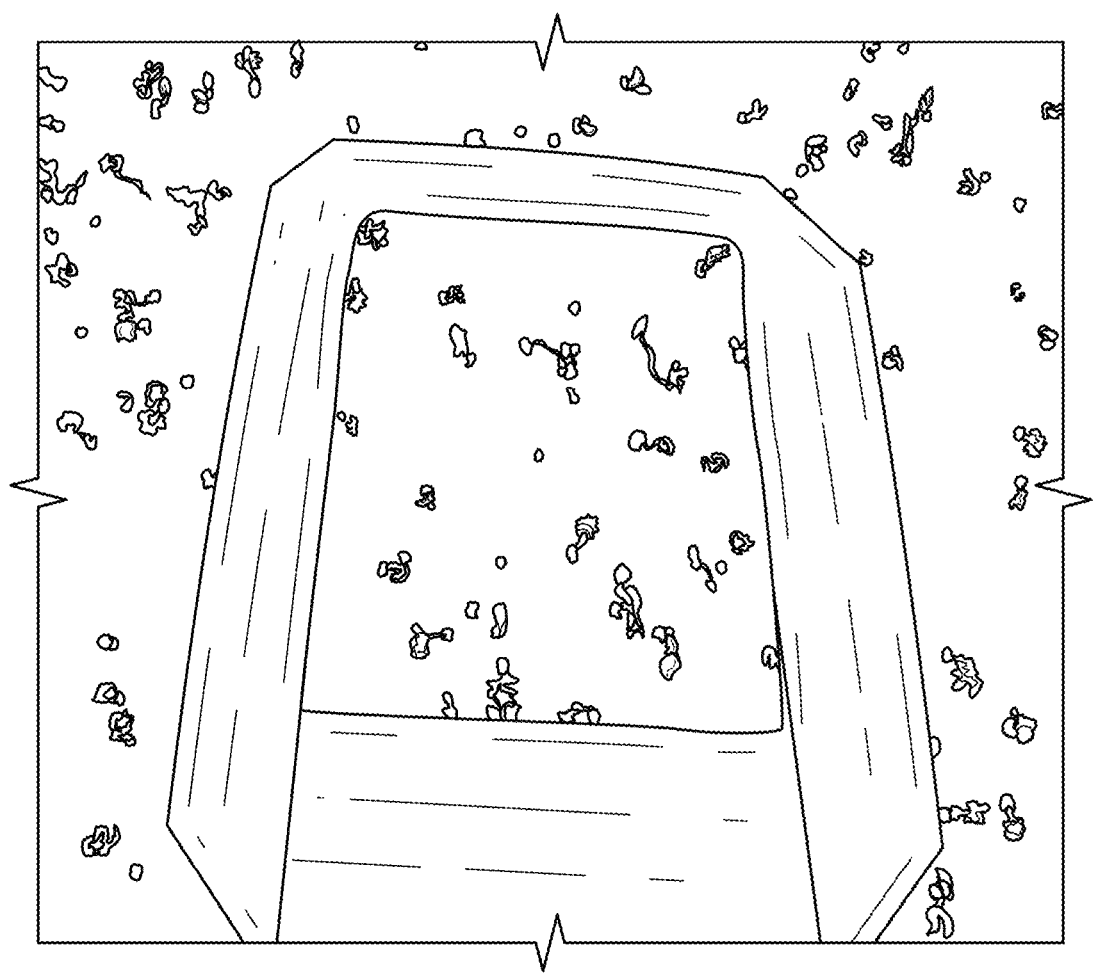
FIG. 9 is an image of a soilless growth medium with seeds, germinated seeds, hypocotyls, and cotyledons.

This example illustrates estimating the percent germination of a masked portion of a textured cloth soilless growth medium (as shown in FIG. 9) with seeds that are exposed to germination conditions for about 3 days. The cloth is mounted on a tray and formed a flat. In this example, a combination of seeds, radicles, hypocotyls, seed coats are present after 3 days on the cloth with an upwardly directed nap (outwardly directed from the upper surface and outwardly directed from the lower surface).

Figure 10A:
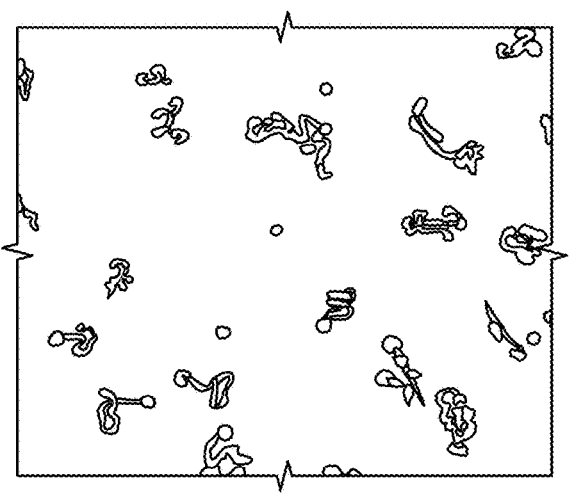
FIG. 10A is a portion of the image in FIG. 9, the image of FIG. 10A is a Red Green Blue (RGB) model digital image.

A first image of the masked area on the flat with seeds exposed to germination conditions is captured as an RGB image (as shown in FIG. 10A). This image is converted to a binary black and white image and the features cropped from the RGB image using thresholding, as described in Example 1 above.

Figure 10B:
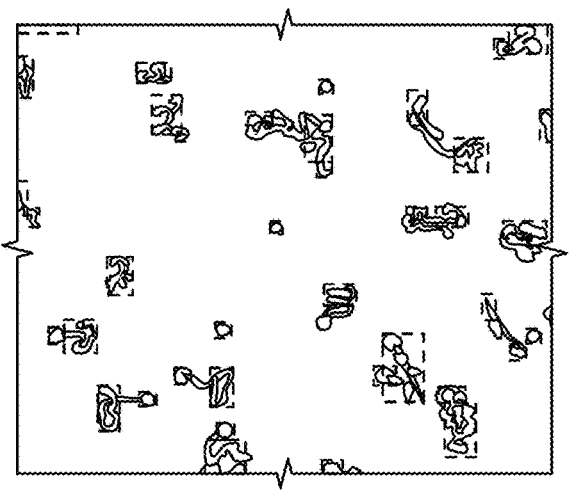
FIG. 10B is a representation of the image in FIG. 10A with initial cropped feature images enclosed by rectangular boarders.
Figure 10C:
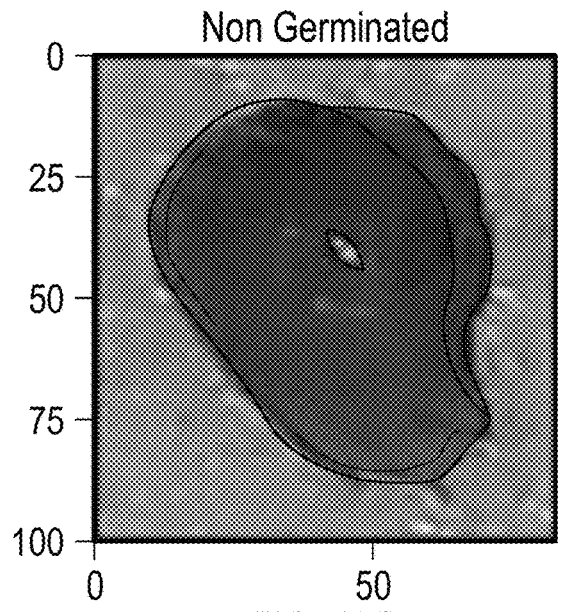
FIG. 10C and FIG. 10D are images of non-germinated and germinated seeds respectively on the soilless growth medium that can be used as final cropped features in the deep learning model.
Figure 10D:
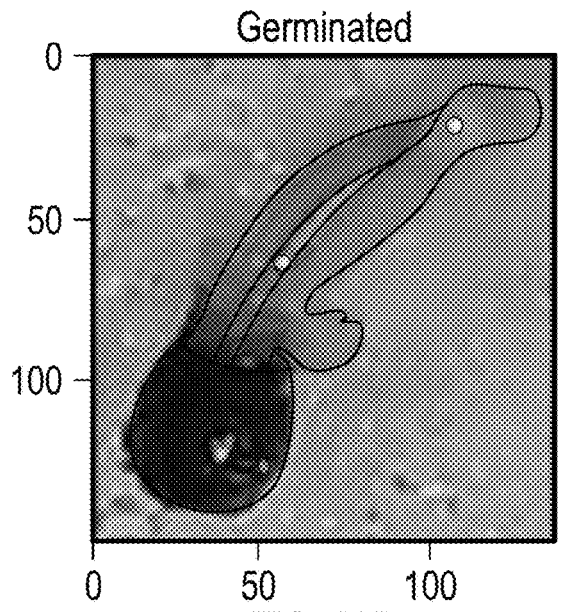

The cropped feature images from the RGB image are shown by rectangles surrounding the one or more features (as shown in FIG. 10B). Representative examples of final cropped feature images are characterized as non-germinated (as shown in FIG. 10C) and germinated (as shown in FIG. 10D).

The cropped images are input into the previously trained deep learning model #23 from Example 2 where the filters, convolution layers, dense layer, and activation layer provide a characterization accuracy of about 87.86% on a known set of feature images.

The germination rate or germination profile for the image masked area illustrated in FIG. 9 is calculated to be 75.81% or about 76%.

The average time to manually count seeds from three masked areas similar to the masked area shown in FIG. 9 on a flat was about 9 minutes. The system and method of this Example can characterize an entire flat in about 30 seconds or less depending on the microprocessor specification of the system.

Example 4

Figure 11:
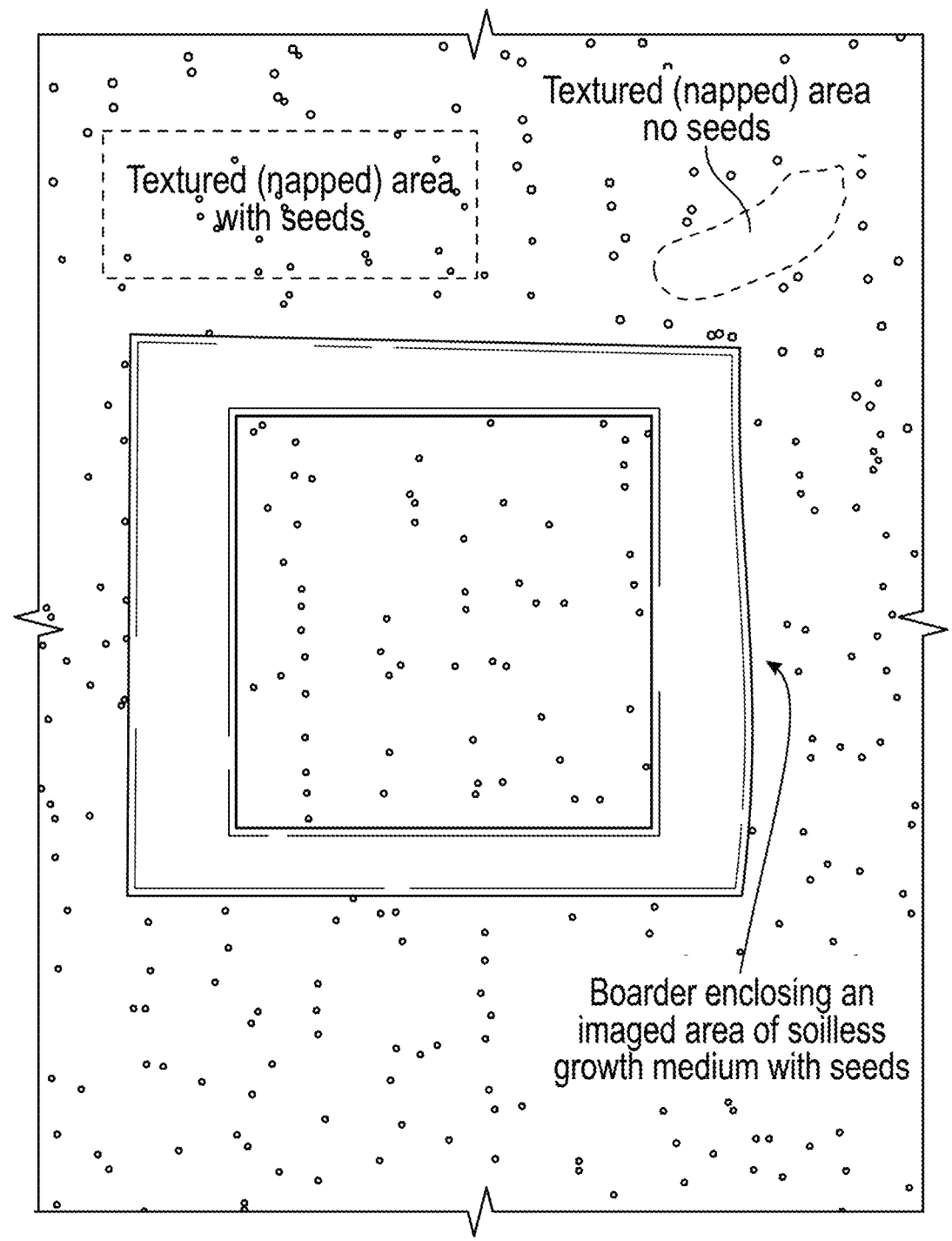
FIG. 11 is an image of a textured soilless growth medium with seeds.

The image in FIG. 11 is an example of a soilless cloth growth medium with texture that has seeds distributed on an upper surface of the cloth. The cloth texture includes an upwardly directed nap on the upper surface (can also be referred to as an outwardly directed nap on the upper surface) and an outwardly directed nap on the bottom surface. The textured cloth has a napped area with seeds (see region in FIG. 11 enclosed by solid box) and a napped region without seeds (see enclosed irregularly shaped dashed region in FIG. 11).

The image of the cloth in FIG. 11 illustrates that the texture, the outwardly directed nap of the soilless growth medium has a feature size (e.g. size within a factor of about ±5× or less) similar to the size of the seeds. The texture shown in the image is a napped fleece material.

This example illustrates a soilless growth medium with a texture that is substantially on the same scale or size as the seeds. In FIG. 11, the seeds generally rest in the low areas between the raised texture or nap.

FIG. 1 is a flowchart that illustrates a method of monitoring seeds on a soilless growth medium or substrate exposed to germination conditions according to an embodiment of the disclosure. The method can include the acts or steps of capturing a first image of seeds on the soilless grow medium (s110), converting the first image into a binary image (s120), cropping final features from the first image (s130), inputting the cropped final features into a previously trained deep learning model (s140), determining whether the cropped final feature is a germinated or non-germinated seed based on the output of the deep learning model (s150), and generating a germination profile (s160).

Figure 2:
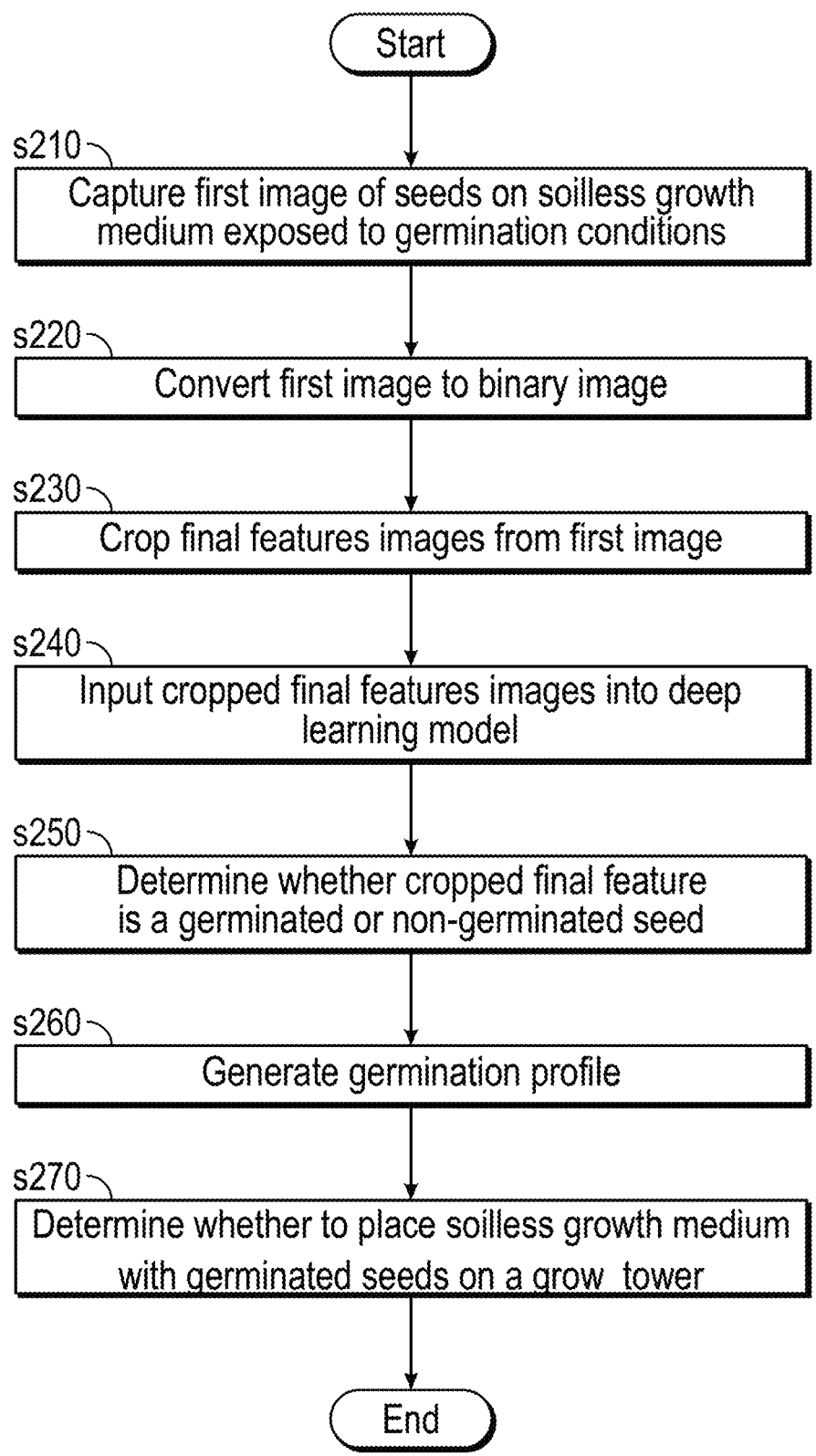
FIG. 2 is a flowchart that illustrates a method of monitoring seeds on a soilless growth medium or substrate exposed to germination conditions according to another embodiment of the disclosure.

FIG. 2 is a flowchart that illustrates a method of monitoring seeds on a soilless growth medium or substrate exposed to germination conditions according to another embodiment of the disclosure. The method can include the acts or steps of capturing a first image of seeds on the soilless grow medium exposed to germination conditions (s210), converting the first image into a binary image (s220), cropping final feature images from the first image (s230), inputting the cropped final features into a previously trained deep learning model (s240), determining whether the cropped final feature is a germinated or non-germinated seed based on the output of the deep learning model (s250), generating a germination profile (s260), and determining whether to place the soilless growth medium with germinated seeds on a grow tower (s270).

Figure 3:
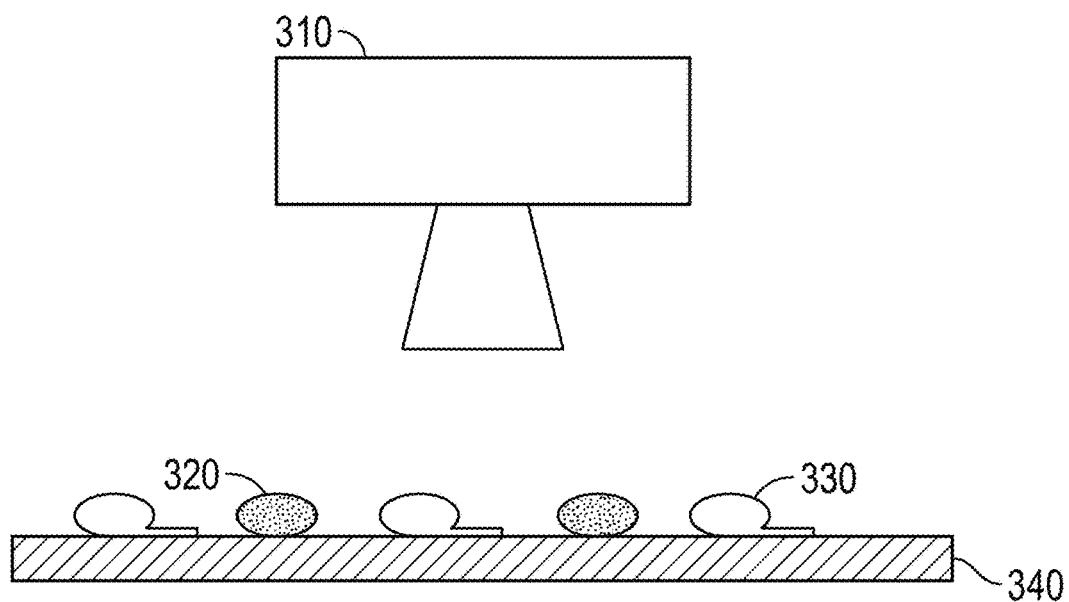
In FIG. 3 is an illustration of an imaging device 310 positioned to capture an image of non-germinated seeds 320 and germinated seeds 330 exposed to germination conditions on a soilless growth medium 340.

In FIG. 3 is an illustration of an imaging device 310 positioned to capture an image of non-germinated seeds 320 and germinated seeds 330 exposed to germination conditions on a soilless growth medium 340.

In embodiments of the disclosure, the image capturing device 310 can be, but is not limited to, a still camera, a digital camera, a multi spectral camera, a hyper spectral camera, a video camera, and the like. The image capturing device 310 may be stationary or moveable (e.g., by being assembled on a drone or vehicle), and may be configured to capture images, videos, or both (hereinafter referred to as images, merely for simplicity purposes), of a target area on the soilless growth medium including non-germinated seeds 320 and germinated seeds 330 on a soilless growth medium 340. The image capturing device 310 may be a high-resolution imaging device. The image capturing device 310 can have a resolution such as 480×480 or better. The image(s) captured by the image capturing device 310 can be transformed between various color models such as RGB, HSV, and the like as needed. In some embodiments of the disclosure, the image capturing device 310 is a digital camera that captures images in a red, green, and blue (RGB) color model format which is transformed into a hue, saturation, value (HSV) model format using known transformations. In some embodiments of the disclosure, the image (e.g., the first image of FIG. 1) can be an RGB image that can be converted or transformed into an HSV model image, the HSV model can then be transformed into a binary image using threshold criteria.

Figure 4:
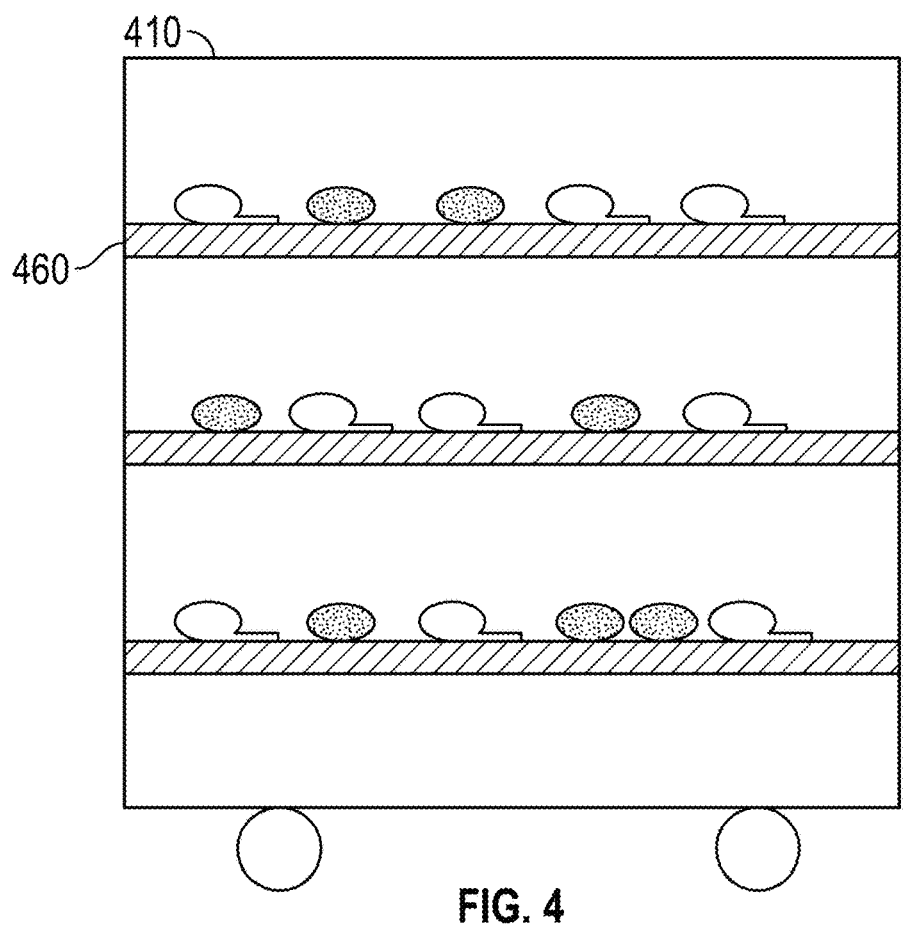
FIG. 4 is an illustration of an enclosure containing soilless growth media 460 with non-germinated and germinated seeds on a top surface, the growth media 460 can be arranged within an enclosure 410.

FIG. 4 is an illustration of an enclosure containing soilless growth media 460 with non-germinated and germinated seeds on a top surface, the growth media 460 can be arranged within an enclosure 410. The soilless growth media 460 illustrates seeds atop the soilless growth media 460 that can be exposed to germination conditions in the enclosure 410.

FIG. 5A illustrates a cloth soilless growth medium with an outwardly directed nap (see upper left), stem fragments and root fragments from plants previously harvested on the cloth, and germinated seeds and non-germinated seeds. This is an example of a captured RGB model first image of one or more seeds, germinated seeds, stem fragments, or any combination of these exposed to germination conditions atop a soilless growth medium. At a predetermine time interval of 3 days, a digital camera was used to capture an image of a masked portion of the seeds on the cloth that were exposed to the germination conditions. The camera captured a red, green, blue (RGB) model digital image of the cloth soilless growth medium with any non-germinated seeds, germinated seeds, and remaining plant stems, as illustrated in FIG. 5A.

Figure 5B:
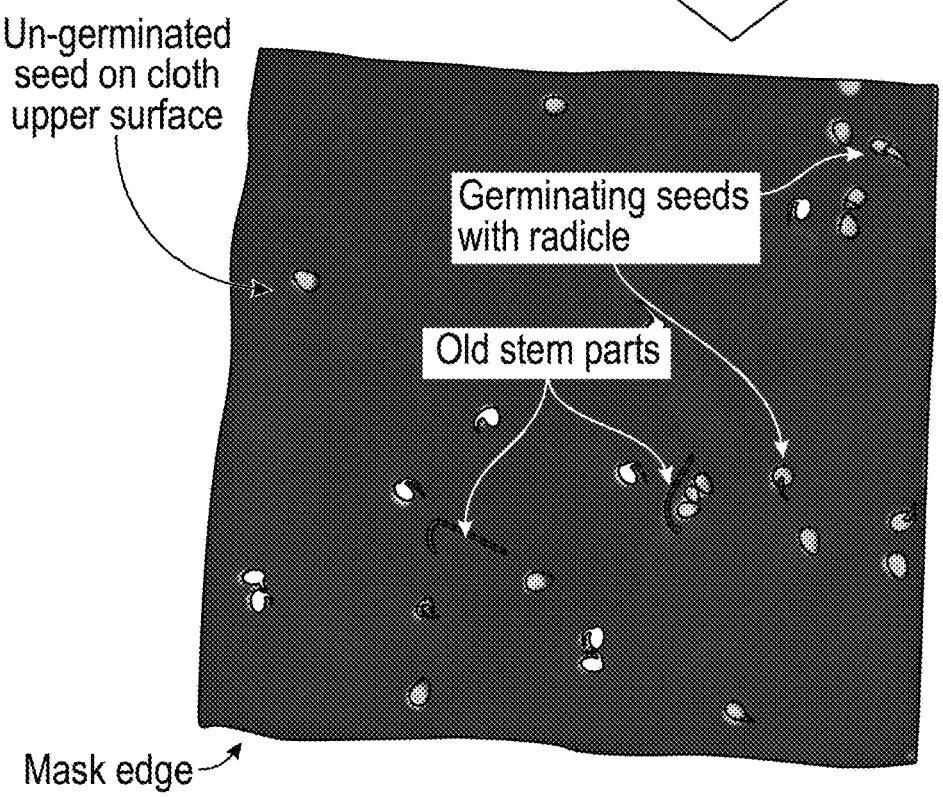
FIG. 5B is an example of the first RGB model image in FIG. 5A transformed into an HSV model image.

FIG. 5B is an example of an HSV model image. The first RGB model image in FIG. 5A was transformed into the HSV image shown in FIG. 5B to contrast the germinated seeds and non-germinated seeds from the background cloth soilless growth medium and texture of the medium. The upwardly directed nap of the cloth was effectively removed by the transformation from the RGB model to the HSV image model, the soilless growth medium appears a substantially uniform violet. Thus, in practice, the cloth in FIG. 5B would appear a substantially uniform violet, and portions of the old stem and root parts, non-germinated seeds, and germinated seeds and radicles remain appear greenish in image.

To standardize the HSV image output, the HSV image is further transformed into a gray scale image using an HSV to gray scale thresholding criteria, the result is shown in the grayscale image in FIG. 6A. In the grayscale image, the germinated seeds and non-germinated seeds and some old stems and roots are depicted as being light colored on the darker cloth.

Figure 5C:
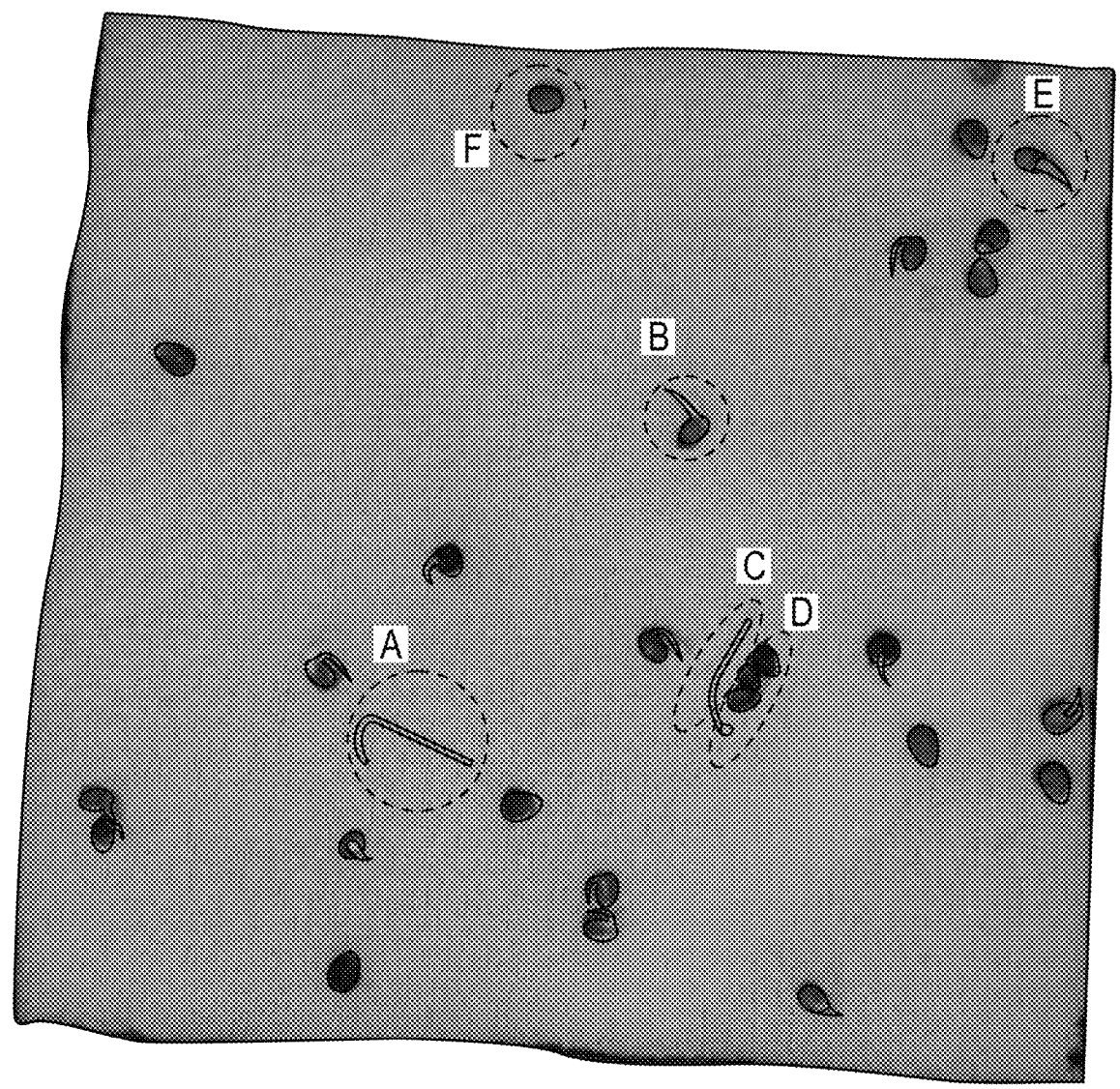
FIG. 5C is a detailed view of the image in FIG. 5A which illustrates seeds exposed to germination conditions on a soilless growth medium (A) old plant stem; (B) germinated seed with radicle that has a color similar to the soilless growth medium (background); (C) old plant stem on the soilless growth medium; (D) multiple seeds adjacent one another on the soilless growth medium; (E) a germinated seed with epicotyl or radicle emerging.

FIG. 5C is a detailed view of the image in FIG. 5A which illustrates seeds exposed to germination conditions on a soilless growth medium. Reference A is an old plant stem. Reference B is a germinated seed with radicle that has a color similar to the soilless growth medium (background). Reference C is an old plant stem on the soilless growth medium. Reference D is multiple seeds adjacent one another on the soilless growth medium. Reference E is a germinated seed with epicotyl or radicle emerging.

FIG. 6A is a gray-scale image of the first image in HSV model in FIG. 5B after a transformation using an HSV to gray scale color thresholding value.

FIG. 6B is a black and white binary image of the gray scale image in FIG. 6A after a transformation using a gray scale to binary image thresholding value. The grayscale image of FIG. 6A was converted into a black and white binary image shown in FIG. 6B, with seeds colored black, using a gray scale to binary thresholding criteria. FIG. 6B illustrates that the stems were partially removed from the grayscale image by converting it into the black and white binary image.

FIG. 6C is a white and black binary image that is the inverted image of FIG. 6B. The black and white binary image of FIG. 6B was inverted to give a white and black binary image with the seeds colored white, as shown in FIG. 6C. The one or more features remaining in the white and black binary image were identified using an object detection algorithm and a number of interconnected white pixels. The connected white pixels were treated as one object or feature by the object detection algorithm and the co-ordinates (position/location) of that feature in binary image captured. To avoid tiny white dots (noise) which were not seeds, there was a pre-defined threshold area so that if the area of the detected feature exceeded that threshold value then only consider the feature as a germinated seed or non-germinated seed. The threshold in the example was 150 white pixels, and features having a number of interconnected pixels below 150 pixels were not considered to be a seed or germinated seed. For each feature meeting the threshold, the coordinates of a cropped rectangular area that contained the feature in the binary image were determined. These coordinates were applied as seed cropping boundaries to the RGB image, but the coordinates could also be applied to the HSV image, or the binary image when the dimensions and resolution of these images were the same as the RGB and grayscale images. This is illustrated in FIG. 7A (RGB), FIG. 7B (HSV) and FIG. 7C (Gray). The cropped feature from the first image corresponding to these coordinates provided initial cropped feature images as shown in FIG. 8. These images illustrate examples of cropped feature images from the masked section of the soilless growth medium and were part of the input for training set used for the deep learning model. In the image above of the masked section, about 24 features were present.

After cropping each initial feature image, i.e. a germinated seed or non-germinated seed, from the first image (RGB image), the area of each initial feature was determined and an average area of all the initial features was also determined. The area of each initial feature in a cropped rectangle was calculated by summing the number of interconnected white pixels comprising the initial feature. The average area of all the initial cropped features was calculated by summing the areas of the individual initial cropped feature images and dividing by the number of initial cropped feature images used in the sum.

Each initial cropped feature image was subsequently divided by a scaled value of the average area of the initial cropped features to form one or more final cropped feature images. Where the initial cropped feature image area was less than 1.5 times the average area of the initial cropped features, count the initial cropped feature image as 1 seed; after cropping, if the initial cropped feature image area was greater than 1.5 times the average area of the initial cropped features, count the initial cropped feature image as two seeds and divide the initial cropped feature image in two parts; after cropping, if the initial cropped feature image area was greater than 2.5 times the average area of the initial cropped feature, count the initial cropped feature image as 3 seeds and partition the initial cropped feature image into three parts, and so on. Once separated, the individual images were input to the deep learning model.

The entire flat of seeds exposed to germination conditions on the soilless growth medium totaled about 1657 seeds/features. The cropped RGB feature images from the test flat were visually analyzed and categorized as either being germinated or as being non-germinated. The visual analysis resulted in 848 germinated and 809 non germinated seeds being identified from the cropped RGB image features. About 80% of these manually identified images were used to develop/train a deep learning model (see Example 2) and the remaining approximately 20% of the images used to verify the developed deep learning models.

FIG. 7A is a representation of the first image (e.g., FIG. 5A and FIG. 5C) as an RGB model image with the initial features cropped and enclosed by rectangular boarders.

Figure 7B:
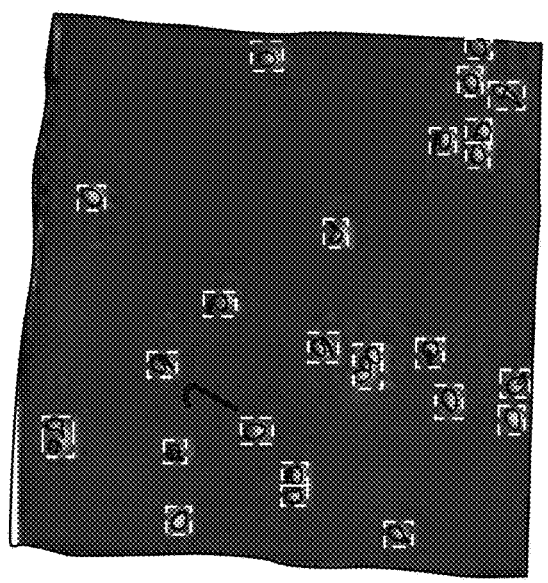
FIG. 7B is a representation of the HSV model image of the first RGB image also illustrating the cropped features with rectangular boarders.

FIG. 7B is a representation of the HSV model image of the first RGB image (e.g., FIG. 5A) also illustrating the cropped features with rectangular boarders. In practice, the cloth in FIG. 7B would appear a substantially uniform violet, and portions of the old stem and root parts, non-germinated seeds, and germinated seeds and radicles remain appear greenish in image.

Figure 7C:
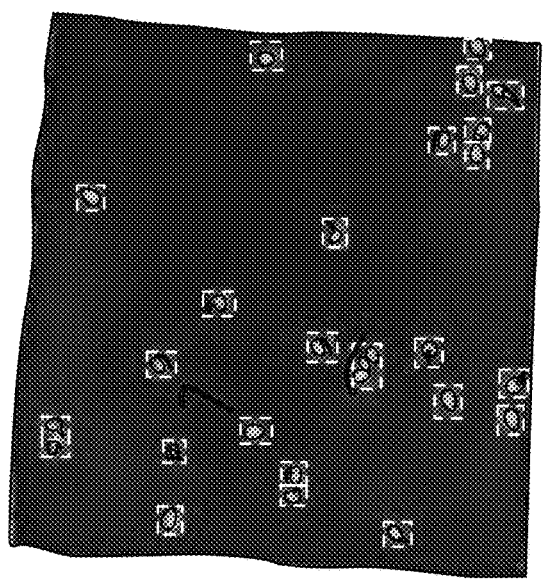
FIG. 7C is a representation of the gray scale transformation of the first image with cropping boundaries.

FIG. 7C is a representation of the gray scale transformation of the first image with cropping boundaries.

FIG. 8 shows a representative set of initial cropped features images (a)-(x). These initial cropped feature images and can include one or more non-germinated seeds (h), one or more germinated seeds (a), combinations of one or more of these as illustrated by (m) and (r), and the like.

Each initial cropped feature image, may include one or more seeds or germinated seeds as illustrated in FIG. 8(m) or FIG. 8(r). These initial cropped features can be further divided by a scaled value of the average area of the initial cropped feature images and used to produce one or more final cropped feature images. For example, if after cropping, the initial cropped feature image area was less than 1.5 times the average initial cropped feature area, do not divide the image; after cropping, if the initial cropped feature image area was greater than 1.5 times the average initial cropped feature area, divide the image in two separate images; after cropping, if the cropped initial cropped feature image area was greater than 2.5 times the average initial cropped feature area, divide the image into three separate images; after cropping, if the cropped initial cropped feature image area was greater than 3.5 times the average initial cropped feature area, divide the image into four separate images, and so on. Once separated, the individual images can be input to the deep learning model. Using this technique, FIG. 8(m) can be divided into three images for input into the deep learning model, FIG. 8(r) can be divided into two images for input into the deep learning model, and FIG. 8(b) may not be divided and input into the deep learning model directly.

FIG. 8 shows a representative set of initial cropped features images. These initial cropped feature images can include non-germinated seeds, germinated seeds, and the like. The area of the features in these images as well as an average feature area can be determined. This average can be used to divide the initial cropped feature by a scaled value of the average and give final cropped feature images for use in the deep learning model.

A first image of one or more seeds, germinated seeds, or any combination of these exposed to germination conditions atop the soilless growth medium may include a series of images captured at a predetermined angle and position with respect to the target area on the soilless growth medium. The time interval between the start of germination and a captured first image can be sufficient to demonstrate seed germination and may be, but is not limited to seconds, minutes, hours, or days. In some embodiments the time interval between the start of germination and a captured first image can be between 1 and 4 days. The resolution of the first image can be sufficient to identify one or more portions of the germinating seeds including radicle, seed coat, ruptured seed coat, hypocotyl or any combination of these. To determine the time from the start of germination to the acquisition of the first image, a series of images can be taken at different times in trial tests with one set of images being used to define the target time for capturing the first image.

A computer processor or microprocessor may be configured to acquire additional test inputs for the system and method in embodiments of the disclosure that may include other information related to seed germination conditions such as, but not limited to one or more of soilless medium type, seed type, seed density, humidity, temperature, time, and the like. The microprocessor coupled to the image capturing device can optionally also be used for processing the image data utilizing the deep learning models, optional test inputs, and outputting the results as a germination profile.

FIG. 9 is an image of a soilless growth medium with seeds, germinated seeds, hypocotyls, and cotyledons. A portion of the soilless growth medium can be masked (black boarder). This illustrates estimating the percent germination of a masked portion of a textured cloth soilless growth medium with seeds that were exposed to germination conditions for about 3 days. The cloth was mounted on a tray and formed a flat. In this example, a combination of seeds, radicles, hypocotyls, seed coats were present after 3 days on the cloth with an upwardly directed nap (outwardly directed from the upper surface (shown) and outwardly directed from the lower surface (not shown)).

FIG. 10A is a Red Green Blue (RGB) model digital image that includes a portion of the image in FIG. 9. More specifically, this image is a first image of the masked area on the flat with seeds exposed to germination conditions. This image may be converted to a binary black and white image and the features cropped from the RGB image using thresholding as described in Example 1 above.

FIG. 10B is a representation of the image in FIG. 10A with initial cropped feature images enclosed by rectangular boarders. The cropped feature images from the RGB image are shown by rectangles surrounding the one or more features.

FIG. 10C and FIG. 10D are images of non-germinated and germinated seeds respectively on the soilless growth medium that can be used as final cropped features in the deep learning model. These images are representative examples of final cropped feature images characterized as non-germinated (FIG. 10C) and germinated (FIG. 10D).

For example, the cropped images as described in FIG. 9 through FIG. 10D may be input into the previously trained deep learning model #23 from Example 2 where the filters, convolution layers, dense layer, and activation layer provided a characterization accuracy of about 87.86% on a known set of feature images. The germination rate or germination profile for the above image masked area of FIG. 9 was calculated to be 75.81% or about 76%.

The average time to manually count seeds from three masked areas similar to the masked area shown above in FIG. 9 on a flat was about 9 minutes. The system and method of this Example can characterize an entire flat in about 30 seconds or less depending on the microprocessor specification of the system.

FIG. 11 is an image of a textured soilless growth medium with seeds. This is an example of a soilless cloth growth medium with texture that has seeds distributed on an upper surface of the cloth. The texture is substantially on the same scale or size as the seeds. The seeds generally rest in the low areas between the raised texture or nap. For example, the outwardly directed nap of the soilless growth medium has a feature size (e.g. size within a factor of about ±5× or less) similar to the size of the seeds. In the embodiment, the texture is a napped fleece material.

In the embodiment, the soilless growth medium has a napped texture that is upwardly directed and the texture is similar in scale to the seeds atop the soilless growth medium. A textured napped area with seeds is illustrated by the rectangle with solid boarders, and a textured napped area without seeds is illustrated by the area enclosed with a broken line.

The cloth texture includes an upwardly directed nap on the upper surface (can also be referred to as an outwardly directed nap on the upper surface) and an outwardly directed nap on the bottom surface (not shown). The textured cloth has a napped area with seeds (see region enclosed by solid box) and a napped region without seeds (see enclosed irregularly shaped dashed region).

This figure is a non-limiting example of a textile that has a texture on a scale of the size of the seeds. In some embodiments the textured cloth can have a napped top surface or the textured cloth can have an upwardly (outwardly from the surface) directed napped top surface. In some embodiments the upper and lower surfaces of the cloth are napped or the upper and lower surfaces have an outwardly directed nap. The textured soilless growth medium can also be a textured fabric that is a loose woven material or non-woven porous material such as a gauze. In some embodiments, the textured soilless growth medium can further include stem fragments on top of or protruding from the soilless growth medium. The stem fragments can be from previous plant development and harvesting from the soilless growth medium. Advantageously in embodiments of the disclosure, the feature identification from the binary image and germinated seed identification from the deep learning model distinguish the seeds exposed to germination conditions from the texture of the soilless growth medium and/or stem fragments remaining on the soilless growth medium.

Figure 12:
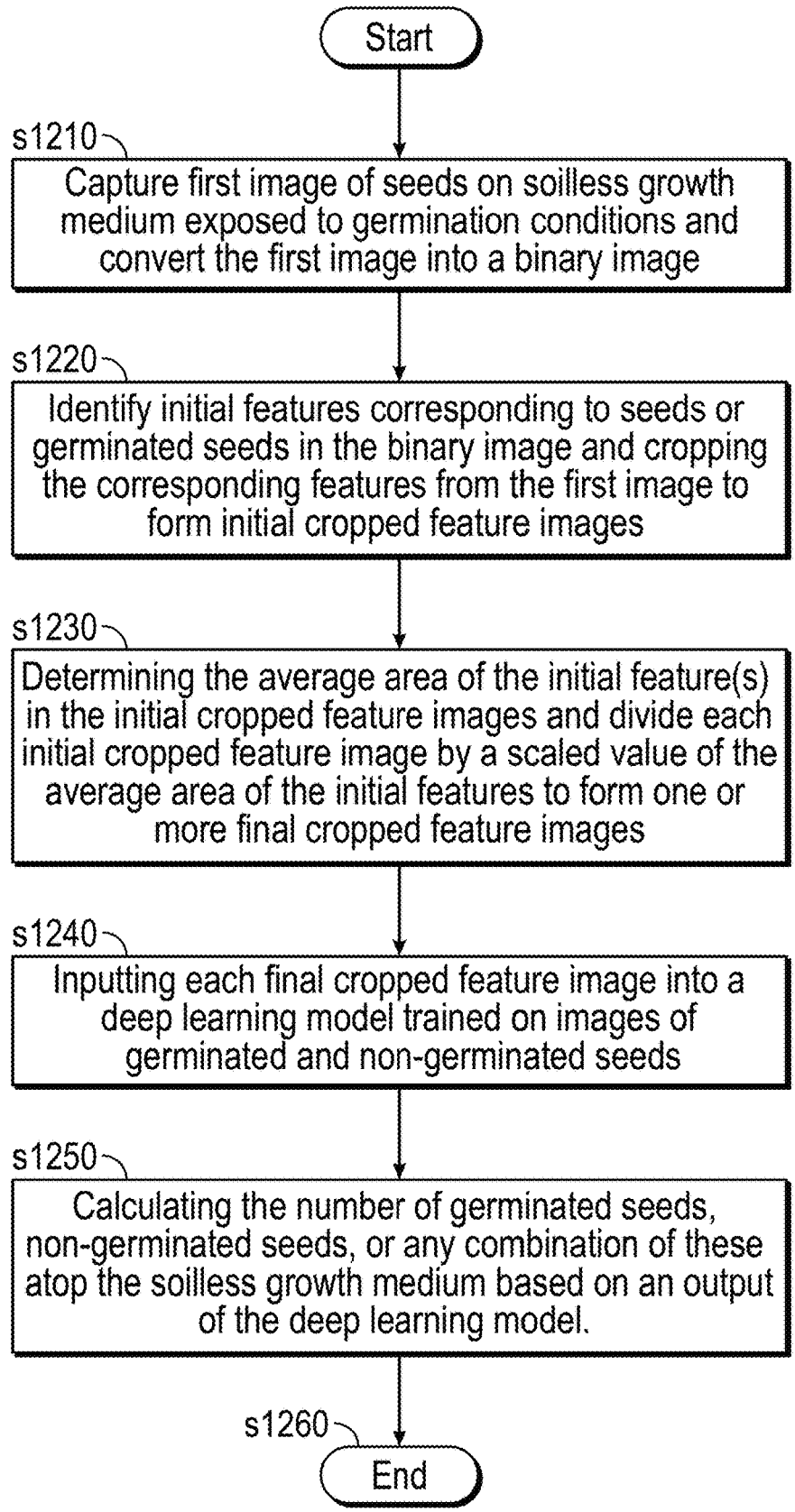
FIG. 12 is a flowchart that illustrates a process of monitoring seeds on a soilless growth medium or substrate exposed to germination conditions according to an embodiment of the disclosure.

FIG. 12 is a flowchart that illustrates a method of monitoring seeds on a soilless growth medium or substrate exposed to germination conditions according to an embodiment of the disclosure. The method can include the acts or steps of capturing a first image of seeds on the soilless grow medium and converting the first image into a binary image (s1210). The method can further include identifying initial features corresponding to the one or more seeds, germinated seeds, or any combination of these in the binary image, and cropping the corresponding initial features from the first image to form initial cropped feature images (s1220). The method can also include determining an average area of the initial features in the initial cropped feature images and dividing each initial cropped feature image by a scaled value of the average area of the initial features to form one or more final cropped feature images (s1230). The method can further include inputting each final cropped feature image into a deep learning model trained on images of germinated and non-germinated seeds (s1240). The method can also include calculating the number of germinated seeds, non-germinated seeds, or any combination of these atop the soilless growth medium based on an output of the deep learning model (s1250).

Figure 13:
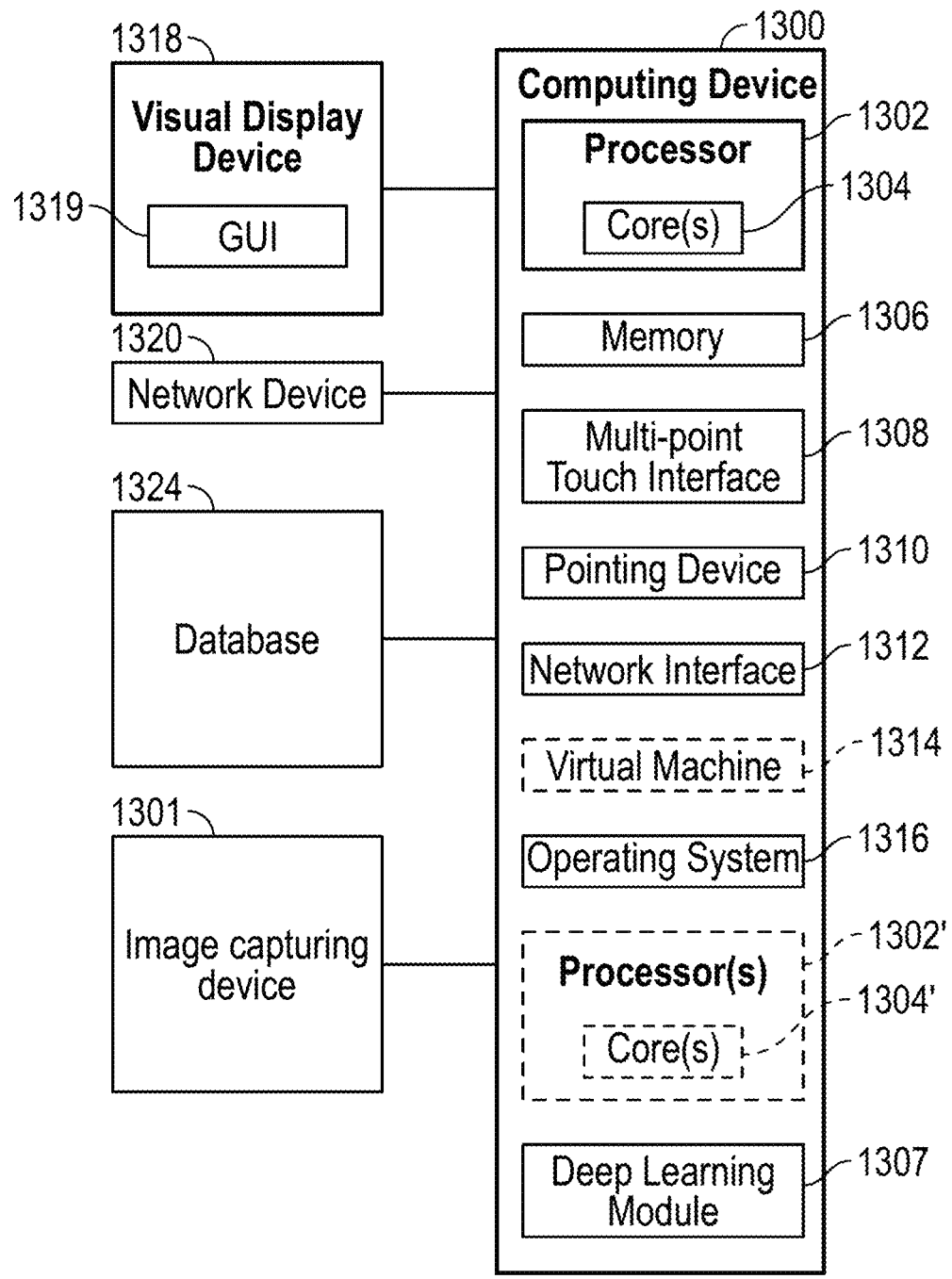
FIG. 13 is a block diagram of an exemplary computing device that can be used to perform one or more steps of the methods provided by exemplary embodiments.

FIG. 13 is a block diagram of an exemplary computing device 1302 that can be used to perform one or more steps of the methods provided by exemplary embodiments. In an exemplary embodiment, computing device 1300 includes a processor (e.g., processor 1302), as described above. Computing device 1300 may further include and/or be coupled to the image capturing device 1301, as described above. Computing device 1300 includes one or more non-transitory computer-readable media for storing one or more computer-executable instructions or software for implementing exemplary embodiments. The non-transitory computer-readable media can include, but are not limited to, one or more varieties of hardware memory, non-transitory tangible media (for example, one or more magnetic storage disks, one or more optical disks, one or more USB flashdrives), and the like. For example, a memory 1306 included in computing device 1300 can store computer-readable and computer-executable instructions or software for implementing exemplary embodiments. Computing device 1300 also includes the processor 1302 and an associated core 1304, and optionally, one or more additional processor(s) 1302' and associated core(s) 1304' (for example, in the case of computer systems having multiple processors/cores), for executing computer-readable and computer-executable instructions or software stored in memory 1306 and other programs for controlling system hardware. Processor 1302 and processor(s) 1302' can each be a single core processor or multiple core (1304 and 1304') processor. Computing device 1300 may include a deep learning module 1307 for executing the deep learning model(s).

Virtualization can be employed in computing device 1300 so that infrastructure and resources in the computing device can be shared dynamically. A virtual machine 1314 can be provided to handle a process running on multiple processors so that the process appears to be using only one computing resource rather than multiple computing resources. Multiple virtual machines can also be used with one processor.

Memory 1306 can include a computer system memory or random access memory, such as DRAM, SRAM, EDO RAM, and the like. Memory 1306 can include other varieties of memory as well, or combinations thereof. In some embodiments, a user can interact with computing device 1300 through a visual display device 1318, such as a touch screen display or computer monitor, which can display one or more user interfaces 1319 that can be provided in accordance with exemplary embodiments, for example, the exemplary user interfaces. Visual display device 1318 may also display other aspects, elements and/or information or data associated with exemplary embodiments. For example, the visual display device 1318 may display images, cropped feature images, and/or germination profile(s), as described herein. Computing device 1300 may include other I/O devices for receiving input from a user, for example, a keyboard or any suitable multi-point touch interface 1308, a pointing device 1310 (e.g., a pen, stylus, mouse, or trackpad). The keyboard 1308 and pointing device 1310 may be coupled to visual display device 1318. Computing device 1300 may include other suitable conventional I/O peripherals.

Computing device 1300 can also include one or more databases devices 1324, such as a hard-drive, CD-ROM, or other computer readable media, for storing data and computer-readable instructions and/or software, that implements embodiments of the system as described herein, or portions thereof. Exemplary storage device 1324 can also store one or more storage devices for storing any suitable information required to implement exemplary embodiments.

Computing device 1300 can include a network interface 1312 configured to interface via one or more network devices 1320 with one or more networks, for example, Local Area Network (LAN), Wide Area Network (WAN) or the Internet through a variety of connections including, but not limited to, standard telephone lines, LAN or WAN links (for example, 1302.11, T1, T3, 56 kb, X.25), broadband connections (for example, ISDN, Frame Relay, ATM), wireless connections, controller area network (CAN), or some combination of any or all of the above. The network interface 1312 can include a built-in network adapter, network interface card, PCMCIA network card, card bus network adapter, wireless network adapter, USB network adapter, modem or any other device suitable for interfacing computing device 1300 to any variety of network capable of communication and performing the operations described herein. Moreover, computing device 1300 can be any computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

Computing device 1300 can run any operating system 1316, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 1316 can be run in native mode or emulated mode. In an exemplary embodiment, the operating system 1316 can be run on one or more cloud machine instances.

The following description is presented to enable any person skilled in the art to create and use a computer system configuration and related method and systems for monitoring and detecting the germination of seeds on soilless growth media. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps can be replaced with a single element, component or step. Likewise, a single element, component or step can be replaced with a plurality of elements, components or steps that serve the same purpose. Moreover, while exemplary embodiments have been shown and described with references to particular embodiments thereof, those of ordinary skill in the art will understand that various substitutions and alterations in form and detail can be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

Approximating language, as used herein throughout the specification and claims, may be applied to modify any quantitative or qualitative representation that could permissibly vary without resulting in a change in the basic function to which it is related. Accordingly, a value modified by a term such as "about" or numerical ranges is not to be limited to a specified precise value, and may include values that differ from the specified value. In at least some instances, the approximating language may correspond to the precision of an instrument for measuring the value.

It will be apparent to those skilled in the art that various modifications and variations can be made in the method and system of the present disclosure without departing from the spirit or scope of the disclosure. Thus, it is intended that the present disclosure include modifications and variations that are within the scope of the appended claims and their equivalents.

What is claimed is:

1. A method of determining seed germination on a soilless growth medium, comprising:
   capturing a first image of one or more seeds, germinated seeds, or any combination of these exposed to germination conditions atop the soilless growth medium and converting the first image into a binary image;
   identifying initial features corresponding to the one or more seeds, germinated seeds, or any combination of these in the binary image, each initial feature identified in the binary image by a number of interconnected white or black pixels above a threshold value; determining coordinates of a rectangle that encloses the interconnected white or black pixels above the threshold value; applying the coordinates of each said rectangle to the first image and cropping the initial features from the first image to form initial cropped feature images, determining an average area of the initial features in the initial cropped feature images; dividing each initial cropped feature image by a scaled value of the average area of the initial features to form one or more final cropped feature images;

inputting each final cropped feature image from the first image into a deep learning model previously trained on images of germinated and non-germinated seeds;

determining whether each final cropped feature image from the first image is a germinated seed or a non-germinated seed based on an output of the deep learning model.

2. The method of claim 1, further comprising generating a germination profile comprising a number of germinated seeds, non-germinated seeds, or any combination of these atop the soilless growth medium.

3. The method of claim 1, wherein said deep learning model comprises a convolution neural network.

4. The method of claim 1, wherein said deep learning model comprises convolution layers, dense layers, activation layers, or any combination of these.

5. The method of claim 1, wherein the soilless growth medium is a textured cloth, fabric, or textile, said cloth, fabric, or textile has a texture on a scale similar to the size of the seeds.

6. The method of claim 1, wherein the textured cloth comprises a napped surface or an outwardly directed napped surface.

7. The method of claim 1, wherein the soilless growth medium comprises a textured fabric that is a loose woven material or a non-woven porous material.

8. The method of claim 1, said deep learning model previously trained on images of germinated and non-germinated seeds atop the soilless growth medium.

9. The method of claim 1, further comprising converting an HSV model of the first image into the binary image.

10. The method of claim 1, further comprising determining whether to position the soilless growth medium in a growth chamber based on the germination profile.

11. The method of claim 1, wherein the threshold number of interconnected white or black pixels is in a range from 100 pixels to 150 pixels.

12. A system for monitoring seed germination on a soilless growth medium, comprising:
a soilless growth medium comprising one or more seeds, germinating seeds, or any combination of these atop the soilless growth medium;
an image capturing device positioned to measure a germination status of the one or more seeds on the soilless growth medium exposed to germination conditions; and
a processor coupled to the image capturing device, the processor is further operable to:
capture a first image of one or more seeds, germinated seeds, or any combination of these exposed to germination conditions atop the soilless growth medium and convert the first image into a binary image;
identify initial features corresponding to the one or more seeds, germinated seeds, or any combination of these in the binary image, and crop the corresponding initial features from the first image to form initial cropped feature images;
determine an average area of the initial features in the initial cropped feature images; divide each initial cropped feature image by a scaled value of the average area of the initial features to form one or more final cropped feature images;
input each final cropped feature image into a deep learning model trained on images of germinated and non-germinated seeds; and,
calculate a number of germinated seeds, non-germinated seeds, or any combination of these atop the soilless growth medium based on an output of the deep learning model.

13. The system of claim 12, wherein the processor is further operable to create a germination profile and determine whether to place the textured soilless growth medium in a grow chamber based on the germination profile.

14. The system of claim 12, wherein said deep learning model comprises convolution layers and dense layers.

15. The system of claim 12, wherein the soilless growth medium is a textured cloth, fabric, or textile, said cloth, fabric, or textile has a texture on a scale similar to the size of the seeds.

16. The system of claim 11, wherein the soilless growth medium is a fabric that has a loose woven or is a non-woven porous substrate.

17. The system of claim 12, wherein the soilless growth medium comprises a layer of a paper and layer of a loose woven or a non-woven porous substrate atop the layer of paper.

18. The system of claim 12, wherein the soilless growth medium further includes stem fragments.

19. The system of claim 12, wherein the soilless growth medium comprises an outwardly directed nap on both the top and bottom surfaces and stem fragments.

20. The system of claim 12, wherein the soilless growth medium is positioned on a frame to form a flat, and wherein said flat further comprises a light barrier layer atop the soilless growth medium and seeds exposed to germination conditions are positioned in openings in the light barrier layer.

21. A computer program product comprising a set of computer instructions stored a non-transitory computer readable medium, the computer instructions comprising instructions executable by a processor to:
receive a first image of one or more seeds, germinated seeds, or any combination of these exposed to germination conditions atop a soilless growth medium and convert the first image into a black and white binary image;
capture a first image of one or more seeds, germinated seeds, or any combination of these exposed to germination conditions atop the soilless growth medium and convert the first image into a binary image;
identify initial features corresponding to the one or more seeds, germinated seeds, or any combination of these in the binary image, and crop the corresponding initial features from the first image to form initial cropped feature images;
determine an average area of the initial features in the initial cropped feature images; divide each initial cropped feature image by a scaled value of the average area of the initial features to form one or more final cropped feature images;
input each final cropped feature image into a deep learning model trained on images of germinated and non-germinated seeds; and, calculate a number of germinated seeds, non-germinated seeds, or any combination of these atop the soilless growth medium based on an output of the deep learning model.

22. The computer program product of claim 21, wherein said deep learning model further comprises convolution layers and dense layers.

23. The computer program product of claim 21, wherein the computer instructions are further executable by the processor to determine whether to position the soilless growth medium in a growth chamber based on the germination profile.

24. A method of determining seed germination on a soilless growth medium, comprising:
   capturing a first image of one or more seeds, germinated seeds, or any combination of these exposed to germination conditions atop the soilless growth medium and converting the first image into a binary image;
   identifying initial features corresponding to the one or more seeds, germinated seeds, or any combination of these in the binary image, and cropping the corresponding initial features from the first image to form initial cropped feature images;
   determining an average area of the initial features in the initial cropped feature images; dividing each initial cropped feature image by a scaled value of the average area of the initial features to form one or more final cropped feature images;
   inputting each final cropped feature image into a deep learning model trained on images of germinated and non-germinated seeds; and,
   calculating a number of germinated seeds, non-germinated seeds, or any combination of these atop the soilless growth medium based on an output of the deep learning model.

25. The method of claim 24, wherein the initial features in the binary image are identified based on a number of interconnected white or black pixels above a threshold value.

26. The method of claims 24, further comprising determining coordinates of a rectangle that encloses the interconnected white or black pixels above the threshold value; applying the coordinates of each rectangle to the first image and cropping initial features from the first image based on the coordinates of each said rectangle.

27. The method of claim 24 further comprising creating a germination profile based on the output from the deep learning model.

28. The method of claim 24, wherein the identifying the initial features is based on threshold number of interconnected white or black pixels is in a range from 100 pixels to 150 pixels.

29. The method of claim 24, wherein the deep learning model previously trained on images of germinated and non-germinated seeds atop a comparable soilless growth medium.

\* \* \* \* \*